(12) United States Patent
Everhart

(10) Patent No.: US 7,899,753 B1
(45) Date of Patent: Mar. 1, 2011

(54) SYSTEMS AND METHODS FOR TIME VARIABLE FINANCIAL AUTHENTICATION

(75) Inventor: Glenn Cobourm Everhart, Smyrna, DE (US)

(73) Assignee: JPMorgan Chase Bank, N.A, New York, NY (US)

( * ) Notice: Subject to any disclaimer, the term of this patent is extended or adjusted under 35 U.S.C. 154(b) by 1112 days.

(21) Appl. No.: 10/419,107

(22) Filed: Apr. 21, 2003

Related U.S. Application Data

(63) Continuation-in-part of application No. 10/105,471, filed on Mar. 25, 2002, now abandoned.

(51) Int. Cl.
*G06Q 99/00* (2006.01)

(52) U.S. Cl. .......... 705/67; 705/64; 705/75; 705/78; 713/185; 726/9; 726/10

(58) Field of Classification Search ........... 705/64–79; 713/185; 726/9, 10
See application file for complete search history.

(56) References Cited

U.S. PATENT DOCUMENTS

| | | | |
|---|---|---|---|
| 3,653,480 | A | 4/1972 | Yamamoto |
| 3,665,162 | A | 5/1972 | Yamamoto |
| 3,713,235 | A | 1/1973 | Roberts et al. |
| 4,123,747 | A | 10/1978 | Lancto et al. |
| 4,200,770 | A | 4/1980 | Hellman et al. |
| 4,218,582 | A | 8/1980 | Hellman et al. |
| 4,223,403 | A | 9/1980 | Konheim et al. |
| 4,321,672 | A | 3/1982 | Braun |
| 4,338,587 | A | 7/1982 | Chiappetti |
| 4,396,985 | A | 8/1983 | Ohara |
| 4,424,414 | A | 1/1984 | Hellman et al. |
| 4,453,074 | A | 6/1984 | Weinstein |
| 4,454,414 | A | 6/1984 | Benton |
| 4,523,087 | A | 6/1985 | Benton |
| 4,575,621 | A | 3/1986 | Dreifus |
| 4,582,985 | A | 4/1986 | Lofberg |
| 4,605,844 | A | 8/1986 | Haggan |
| 4,614,861 | A | 9/1986 | Pavlov et al. |

(Continued)

FOREIGN PATENT DOCUMENTS

DE 19702532 3/1998

(Continued)

OTHER PUBLICATIONS

Clasessens et al., "A Tangled World Wide Web of Secuirty Issues", First Monday.*

(Continued)

*Primary Examiner* — Jalatee Worjloh
(74) *Attorney, Agent, or Firm* — Hunton & Williams

(57) ABSTRACT

The systems and methods of the invention provide a technique for authenticating a finance related transaction. The method may include providing a token which contains a token counter, the token counter periodically advancing to generate a changing token value, the token counter being synchronized to a base counter that generates an authenticating value; transforming the token value into a token output sequence using logic; and outputting at least part of the token output sequence to an authenticating authority, the authenticating authority having access to the authenticating value. Further, the method includes the authenticating authority verifying the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence.

33 Claims, 10 Drawing Sheets

U.S. PATENT DOCUMENTS

| | | |
|---|---|---|
| 4,633,036 A | 12/1986 | Hellman et al. |
| 4,650,981 A | 3/1987 | Foletta |
| 4,672,377 A | 6/1987 | Murphy |
| 4,697,072 A | 9/1987 | Kawana |
| 4,700,055 A | 10/1987 | Kashkashian |
| 4,701,601 A | 10/1987 | Francini et al. |
| 4,755,661 A | 7/1988 | Ruebsam |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,851,650 A | 7/1989 | Kitade |
| 4,988,849 A | 1/1991 | Sasaki |
| 5,023,904 A | 6/1991 | Kaplan |
| 5,053,607 A | 10/1991 | Carlson |
| 5,054,096 A | 10/1991 | Beizer |
| 5,097,115 A | 3/1992 | Ogasawara et al. |
| 5,111,395 A | 5/1992 | Smith |
| 5,146,068 A | 9/1992 | Ugawa et al. |
| 5,163,098 A | 11/1992 | Duhbura |
| 5,175,682 A | 12/1992 | Higashiyama |
| 5,177,342 A | 1/1993 | Adams |
| 5,180,901 A | 1/1993 | Hiramatsu |
| 5,206,488 A | 4/1993 | Teicher |
| 5,225,664 A | 7/1993 | Lijima |
| 5,225,978 A | 7/1993 | Petersen et al. |
| 5,237,159 A | 8/1993 | Stephens |
| 5,237,620 A | 8/1993 | Deaton |
| 5,283,829 A | 2/1994 | Anderson |
| 5,287,269 A | 2/1994 | Dorrough |
| 5,311,594 A | 5/1994 | Penzias |
| 5,326,959 A | 7/1994 | Perazza |
| 5,336,870 A | 8/1994 | Hughes |
| 5,350,906 A | 9/1994 | Brody |
| 5,352,877 A | 10/1994 | Morley |
| 5,361,062 A * | 11/1994 | Weiss et al. .................. 340/5.26 |
| 5,367,581 A | 11/1994 | VanHorn et al. |
| 5,373,550 A | 12/1994 | Campbell |
| 5,380,046 A | 1/1995 | Stephens |
| 5,382,784 A | 1/1995 | Eberhardt |
| 5,396,417 A | 3/1995 | Burks |
| 5,402,474 A | 3/1995 | Miller |
| 5,409,092 A | 4/1995 | Itako et al. |
| 5,412,190 A | 5/1995 | Josephson et al. |
| 5,420,405 A | 5/1995 | Chasek |
| 5,424,938 A | 6/1995 | Wagner |
| 5,430,644 A | 7/1995 | Deaton et al. |
| 5,432,326 A | 7/1995 | Noblett et al. |
| 5,444,841 A | 8/1995 | Glaser |
| 5,446,740 A | 8/1995 | Yien |
| 5,448,471 A | 9/1995 | Deaton |
| 5,450,479 A | 9/1995 | Alesio |
| 5,450,491 A | 9/1995 | McNair |
| 5,457,305 A | 10/1995 | Akel et al. |
| 5,465,206 A | 11/1995 | Hilt |
| 5,466,920 A | 11/1995 | Nair et al. |
| 5,479,494 A | 12/1995 | Clitherow |
| 5,479,532 A | 12/1995 | Abel |
| 5,481,094 A | 1/1996 | Suda |
| 5,483,445 A | 1/1996 | Pickering |
| 5,484,988 A | 1/1996 | Hills |
| 5,489,123 A | 2/1996 | Eda |
| 5,504,677 A | 4/1996 | Pollin |
| 5,506,691 A | 4/1996 | Bednar |
| 5,511,184 A | 4/1996 | Lin |
| 5,513,250 A | 4/1996 | McAllister |
| 5,537,314 A | 7/1996 | Kanter |
| 5,544,040 A | 8/1996 | Gerbaulet |
| 5,550,358 A | 8/1996 | Tait |
| 5,550,734 A | 8/1996 | Tarter |
| 5,551,021 A | 8/1996 | Harada |
| 5,557,092 A | 9/1996 | Ackley |
| 5,563,934 A | 10/1996 | Carlisle |
| 5,566,330 A | 10/1996 | Sheffield |
| 5,568,489 A | 10/1996 | Yien |
| 5,583,759 A | 12/1996 | Geer |
| 5,583,933 A | 12/1996 | Mark |
| 5,585,787 A | 12/1996 | Wallerstein |
| 5,590,038 A | 12/1996 | Pitroda |
| 5,592,378 A | 1/1997 | Cameron |
| 5,592,553 A | 1/1997 | Guski et al. |
| 5,613,002 A | 3/1997 | Kephart et al. |
| 5,621,201 A | 4/1997 | Langhans |
| 5,640,577 A | 6/1997 | Scharmer |
| 5,649,117 A | 7/1997 | Landry |
| 5,649,118 A | 7/1997 | Carlisle |
| 5,650,604 A | 7/1997 | Marcous |
| 5,652,786 A | 7/1997 | Rogers |
| 5,659,165 A | 8/1997 | Jennings |
| 5,659,469 A | 8/1997 | Deaton |
| 5,661,807 A | 8/1997 | Guski et al. |
| 5,677,521 A | 10/1997 | Hook et al. |
| 5,677,955 A | 10/1997 | Doggett |
| 5,679,938 A | 10/1997 | Templeton |
| 5,679,940 A | 10/1997 | Templeton |
| 5,680,459 A | 10/1997 | Furuta et al. |
| 5,692,132 A | 11/1997 | Hogan |
| 5,698,837 A | 12/1997 | Murphee et al. |
| 5,699,528 A | 12/1997 | Hogan |
| 5,703,344 A | 12/1997 | Bezy |
| 5,708,422 A | 1/1998 | Blonder |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,721,781 A | 2/1998 | Deo et al. |
| 5,724,423 A | 3/1998 | Khello |
| 5,724,424 A | 3/1998 | Gifford |
| 5,727,249 A | 3/1998 | Pollin |
| 5,732,136 A | 3/1998 | Murphee et al. |
| 5,734,154 A | 3/1998 | Jachimowicz et al. |
| 5,737,421 A | 4/1998 | Audebert |
| 5,745,555 A | 4/1998 | Mark |
| 5,748,737 A | 5/1998 | Daggar |
| 5,748,780 A | 5/1998 | Stolfo |
| 5,764,770 A | 6/1998 | Schipper et al. |
| 5,770,843 A | 6/1998 | Rose |
| 5,790,636 A | 8/1998 | Marshall |
| 5,793,861 A | 8/1998 | Haigh |
| 5,794,221 A | 8/1998 | Egendorf |
| 5,796,827 A | 8/1998 | Coppersmith et al. |
| 5,802,176 A | 9/1998 | Audebert |
| 5,802,498 A | 9/1998 | Comesanas |
| 5,805,719 A | 9/1998 | Pare, Jr. et al. |
| 5,819,236 A | 10/1998 | Josephson |
| 5,823,463 A | 10/1998 | Fissmann et al. |
| 5,825,871 A | 10/1998 | Mark |
| 5,826,241 A | 10/1998 | Stein |
| 5,826,245 A | 10/1998 | Sandberg-Diment |
| 5,832,090 A | 11/1998 | Raspotnik |
| 5,832,211 A | 11/1998 | Blakley, III et al. |
| 5,832,460 A | 11/1998 | Bednar |
| 5,832,463 A | 11/1998 | Funk |
| 5,832,464 A | 11/1998 | Houvener |
| 5,835,603 A | 11/1998 | Coutts |
| 5,838,812 A | 11/1998 | Parre |
| 5,838,903 A | 11/1998 | Blakely, III et al. |
| 5,852,812 A | 12/1998 | Reeder |
| 5,859,419 A | 1/1999 | Wynn |
| 5,862,323 A | 1/1999 | Blakely, III et al. |
| 5,864,609 A | 1/1999 | Cross |
| 5,870,456 A | 2/1999 | Rogers |
| 5,870,721 A | 2/1999 | Norris |

| | | | | | | |
|---|---|---|---|---|---|---|
| 5,870,723 | A | 2/1999 | Pare | 6,374,230 | B1 | 4/2002 | Walker |
| 5,870,725 | A | 2/1999 | Belinger | 6,382,677 | B1 | 5/2002 | Teraoka et al. |
| 5,872,917 | A | 2/1999 | Hellman | 6,411,933 | B1 | 6/2002 | Maes et al. |
| 5,873,072 | A | 2/1999 | Kight | 6,419,161 | B1 | 7/2002 | Haddad |
| 5,881,151 | A | 3/1999 | Yamamoto | 6,424,029 | B1 | 7/2002 | Giesler |
| 5,883,810 | A | 3/1999 | Franklin | 6,429,927 | B1 | 8/2002 | Borza |
| 5,884,288 | A | 3/1999 | Chang | 6,434,259 | B1 | 8/2002 | Hamid et al. |
| 5,887,065 | A | 3/1999 | Audebert | 6,446,210 | B1 | 9/2002 | Borza |
| 5,897,625 | A | 4/1999 | Gustin | 6,498,861 | B1 | 12/2002 | Hamid et al. |
| 5,901,303 | A | 5/1999 | Chew | 6,507,644 | B1 | 1/2003 | Henderson |
| 5,903,881 | A | 5/1999 | Schrader | 6,507,912 | B1 | 1/2003 | Matyas, Jr. et al. |
| 5,907,142 | A | 5/1999 | Kelsey | 6,529,880 | B1 | 3/2003 | McKeen et al. |
| 5,920,847 | A | 7/1999 | Kolling | 6,539,363 | B1 | 3/2003 | Allgeier et al. |
| 5,930,778 | A | 7/1999 | Geer | 6,557,750 | B1 * | 5/2003 | Druse et al. ............... 229/162.1 |
| 5,937,068 | A | 8/1999 | Audebert | 6,580,814 | B1 | 6/2003 | Ittycheriah et al. |
| 5,940,811 | A | 8/1999 | Norris | 6,592,044 | B1 | 7/2003 | Wong et al. |
| 5,940,844 | A | 8/1999 | Cahill | 6,609,654 | B1 | 8/2003 | Anderson et al. |
| 5,943,656 | A | 8/1999 | Crooks | 6,609,658 | B1 | 8/2003 | Sehr |
| 5,945,653 | A | 8/1999 | Walker | 6,615,352 | B2 | 9/2003 | Terao |
| 5,953,710 | A | 9/1999 | Fleming | 6,631,849 | B2 | 10/2003 | Blossom |
| 5,963,647 | A | 10/1999 | Downing | 6,641,050 | B2 | 11/2003 | Kelley et al. |
| 5,963,925 | A | 10/1999 | Kolling | 6,651,168 | B1 | 11/2003 | Kao et al. |
| 5,966,698 | A | 10/1999 | Pollin | 6,668,321 | B2 | 12/2003 | Nendell |
| 5,978,780 | A | 11/1999 | Watson | 6,685,088 | B1 | 2/2004 | Royer |
| 5,991,750 | A | 11/1999 | Watson | 6,691,916 | B2 | 2/2004 | Noyes |
| 5,999,596 | A | 12/1999 | Walker et al. | 6,693,544 | B1 | 2/2004 | Hebbecker |
| 5,999,624 | A | 12/1999 | Hopkins | 6,697,947 | B1 | 2/2004 | Matyas, Jr. et al. |
| 6,000,832 | A | 12/1999 | Franklin | 6,705,518 | B2 | 3/2004 | Park et al. |
| 6,003,762 | A | 12/1999 | Hayashida | 6,726,813 | B2 | 4/2004 | Kaule et al. |
| 6,009,442 | A | 12/1999 | Chen | 6,727,802 | B2 | 4/2004 | Kelly |
| 6,016,476 | A | 1/2000 | Maes et al. | 6,732,919 | B2 | 5/2004 | Macklin et al. |
| 6,021,189 | A | 2/2000 | Vu | 6,735,695 | B1 | 5/2004 | Gopalakrishnan et al. |
| 6,029,890 | A | 2/2000 | Austin | 6,742,125 | B1 | 5/2004 | Gabber et al. |
| 6,041,315 | A | 3/2000 | Pollin | 6,754,640 | B2 | 6/2004 | Bozeman |
| 6,042,006 | A | 3/2000 | VanTilburg | 6,764,014 | B2 | 7/2004 | Lasch et al. |
| 6,044,360 | A | 3/2000 | Picciallo | 6,793,131 | B2 | 9/2004 | Hogan |
| 6,045,050 | A | 4/2000 | Ippolito et al. | 6,793,135 | B2 | 9/2004 | Ryoo |
| 6,065,675 | A | 5/2000 | Teicher | 6,804,786 | B1 | 10/2004 | Chamley et al. |
| 6,069,968 | A | 5/2000 | Shaw et al. | 6,805,288 | B2 | 10/2004 | Routhenstein et al. |
| 6,078,888 | A | 6/2000 | Johnson, Jr. | 6,805,289 | B2 | 10/2004 | Noriega et al. |
| 6,088,683 | A | 7/2000 | Jalili | 6,819,219 | B1 | 11/2004 | Bolle et al. |
| 6,092,192 | A | 7/2000 | Kanevsky et al. | 6,845,906 | B2 | 1/2005 | Royer |
| 6,105,006 | A | 8/2000 | Davis et al. | 6,857,566 | B2 | 2/2005 | Wankmueller |
| 6,119,107 | A | 9/2000 | Polk | 6,895,391 | B1 | 5/2005 | Kausik |
| 6,119,932 | A | 9/2000 | Maloney et al. | 6,908,030 | B2 | 6/2005 | Rajasekaran et al. |
| 6,144,848 | A | 11/2000 | Walsh | 6,913,193 | B1 | 7/2005 | Kawan |
| 6,163,771 | A * | 12/2000 | Walker et al. ................... 705/18 | 6,928,427 | B2 | 8/2005 | Rajasekaran et al. |
| 6,170,058 | B1 | 1/2001 | Kausik | 6,931,382 | B2 | 8/2005 | Laage |
| 6,182,220 | B1 | 1/2001 | Chen et al. | 6,938,020 | B2 | 8/2005 | Nakajama |
| 6,182,894 | B1 | 2/2001 | Hackett et al. | 6,938,156 | B2 | 8/2005 | Wheeler et al. |
| 6,185,682 | B1 | 2/2001 | Tang | 6,942,156 | B2 | 9/2005 | Ohta et al. |
| 6,188,309 | B1 | 2/2001 | Levine | 6,950,940 | B2 | 9/2005 | Wheeler et al. |
| 6,192,142 | B1 | 2/2001 | Pare et al. | 6,956,950 | B2 | 10/2005 | Kausik |
| 6,195,698 | B1 | 2/2001 | Lillibridge | 6,957,337 | B1 | 10/2005 | Chainer et al. |
| 6,209,102 | B1 | 3/2001 | Hoover | 6,978,369 | B2 | 12/2005 | Wheeler |
| 6,213,392 | B1 | 4/2001 | Zuppicich | 6,983,381 | B2 | 1/2006 | Jerdonek |
| 6,219,639 | B1 | 4/2001 | Bakis et al. | 6,999,569 | B2 | 2/2006 | Risafi et al. |
| 6,227,447 | B1 | 5/2001 | Campisano | 7,013,293 | B1 | 3/2006 | Kipnis |
| 6,263,446 | B1 | 7/2001 | Kausik et al. | 7,020,782 | B2 | 3/2006 | Rajasekaran et al. |
| 6,269,348 | B1 | 7/2001 | Parre | 7,031,939 | B1 | 4/2006 | Gallagher |
| 6,282,522 | B1 | 8/2001 | Davis et al. | 7,047,222 | B1 | 5/2006 | Bush |
| 6,302,444 | B1 | 10/2001 | Cobben | 7,051,001 | B1 | 5/2006 | Slater |
| 6,308,268 | B1 | 10/2001 | Audebert | 7,051,002 | B2 | 5/2006 | Keresman, III et al. |
| 6,315,195 | B1 | 11/2001 | Ramachandran | 7,051,929 | B2 | 5/2006 | Li |
| 6,317,834 | B1 | 11/2001 | Gennaro et al. | 7,054,842 | B2 | 5/2006 | James et al. |
| 6,324,526 | B1 | 11/2001 | D'Agostino | 7,070,095 | B1 | 7/2006 | Gandel et al. |
| 6,338,048 | B1 | 1/2002 | Mori | 7,072,864 | B2 | 7/2006 | Brake et al. |
| 6,338,049 | B1 | 1/2002 | Walker | 7,082,416 | B2 | 7/2006 | Anderson |
| 6,341,724 | B2 | 1/2002 | Campisano | 7,092,916 | B2 | 8/2006 | Diveley et al. |
| 6,360,954 | B1 | 3/2002 | Bernardo et al. | 7,093,282 | B2 | 8/2006 | Hillhouse |
| 6,366,682 | B1 | 4/2002 | Hoffman | 7,099,850 | B1 | 8/2006 | Mann |
| 6,373,969 | B1 | 4/2002 | Adler | 7,103,576 | B2 | 9/2006 | Mann |

| Patent/Pub No. | Date | Inventor |
|---|---|---|
| 7,107,249 B2 | 9/2006 | Dively et al. |
| 7,111,789 B2 | 9/2006 | Rajasekaran et al. |
| 7,140,036 B2 | 11/2006 | Bhagavatula et al. |
| 7,149,899 B2 | 12/2006 | Pinkas |
| 7,163,153 B2 | 1/2007 | Blossom |
| 7,165,049 B2 | 1/2007 | Slater |
| 7,167,565 B2 | 1/2007 | Rajasekaran |
| 7,181,762 B2 | 2/2007 | Jerdonek |
| 7,191,952 B2 | 3/2007 | Blossom |
| 7,195,154 B2 | 3/2007 | Routhenstein |
| 7,228,155 B2 | 6/2007 | Saunders |
| 7,228,565 B2 | 6/2007 | Wolff et al. |
| 7,249,092 B2 | 7/2007 | Dunn et al. |
| 7,249,099 B2 | 7/2007 | Ling |
| 7,216,091 B1 | 8/2007 | Blandina et al. |
| 7,254,560 B2 | 8/2007 | Singhal |
| 7,269,021 B2 | 9/2007 | Gundlach |
| 7,272,857 B1 | 9/2007 | Everhart |
| 7,287,695 B2 | 10/2007 | Wankmueller |
| 7,306,141 B1 | 12/2007 | Schwarz |
| 7,311,244 B1 | 12/2007 | Schwarz |
| 7,312,707 B1 | 12/2007 | Bishop et al. |
| 7,315,843 B2 | 1/2008 | Diveley et al. |
| 7,324,972 B1 | 1/2008 | Oliver |
| 7,328,350 B2 | 2/2008 | Hird |
| 7,330,836 B2 | 2/2008 | Kausik |
| 7,349,866 B2 | 3/2008 | Schwarz |
| 7,357,331 B2 | 4/2008 | Blossom |
| 7,363,262 B2 | 4/2008 | Reno |
| 7,363,492 B2 | 4/2008 | Kuhlman et al. |
| 7,363,494 B2 | 4/2008 | Brainard |
| 7,398,248 B2 | 7/2008 | Phillips et al. |
| 7,418,728 B2 | 8/2008 | Jerdonek |
| 7,427,033 B1 | 9/2008 | Roskind |
| 7,448,538 B2 | 11/2008 | Fletcher |
| 7,454,794 B1 | 11/2008 | Hibbard |
| 7,461,028 B2 | 12/2008 | Wronski |
| 7,480,631 B1 | 1/2009 | Merced |
| 7,493,288 B2 | 2/2009 | Biship et al. |
| 7,502,933 B2 | 3/2009 | Jakobsson |
| 7,506,806 B2 | 3/2009 | Bonalle et al. |
| 7,591,416 B2 | 9/2009 | Blossom |
| 7,599,856 B2 | 10/2009 | Agrawal et al. |
| 7,606,771 B2 | 10/2009 | Keresman, III et al. |
| 7,707,089 B1 | 4/2010 | Barton |
| 7,711,122 B2 | 5/2010 | Allen et al. |
| 7,716,484 B1 | 5/2010 | Kaliski |
| 2001/0001856 A1 | 5/2001 | Gould et al. |
| 2001/0002487 A1 | 5/2001 | Grawrock et al. |
| 2001/0011250 A1 | 8/2001 | Paltenghe |
| 2001/0027441 A1 | 10/2001 | Wankmueller |
| 2001/0032312 A1 | 10/2001 | Runje et al. |
| 2001/0034720 A1 | 10/2001 | Armes |
| 2001/0051917 A1 | 12/2001 | Bissonette |
| 2002/0023108 A1 | 2/2002 | Daswani |
| 2002/0026416 A1 | 2/2002 | Provinse |
| 2002/0046169 A1 | 4/2002 | Keresman, III et al. |
| 2002/0109435 A1 | 4/2002 | Ye et al. |
| 2002/0062279 A1 | 5/2002 | Behrenbrinker et al. |
| 2002/0065712 A1 | 5/2002 | Kwan et al. |
| 2002/0069104 A1 | 6/2002 | Beach et al. |
| 2002/0073030 A1 | 6/2002 | Offer |
| 2002/0099667 A1 | 6/2002 | Diamandis et al. |
| 2002/0091632 A1 | 7/2002 | Turock et al. |
| 2002/0091649 A1 | 7/2002 | Anvekar et al. |
| 2002/0111886 A1 | 8/2002 | Chenevich et al. |
| 2002/0116330 A1 | 8/2002 | Hed et al. |
| 2002/0117541 A1 | 8/2002 | Biggar et al. |
| 2002/0120846 A1 | 8/2002 | Stewart et al. |
| 2002/0128973 A1 | 9/2002 | Kranzley |
| 2002/0139843 A1 | 10/2002 | Park et al. |
| 2002/0145039 A1 | 10/2002 | Carroll |
| 2002/0147683 A1 | 10/2002 | Capobianco et al. |
| 2002/0147691 A1 | 10/2002 | Davis et al. |
| 2002/0152168 A1 | 10/2002 | Neofytides et al. |
| 2002/0161702 A1 | 10/2002 | Milberger et al. |
| 2002/0169719 A1 | 11/2002 | Dively et al. |
| 2002/0174030 A1 | 11/2002 | Praisner et al. |
| 2002/0178063 A1 | 11/2002 | Gravelle et al. |
| 2002/0190123 A1 | 12/2002 | Anvekar et al. |
| 2002/0194124 A1 | 12/2002 | Hobbs et al. |
| 2002/0198848 A1 * | 12/2002 | Michener ................ 705/75 |
| 2003/0010831 A1 | 1/2003 | Ye |
| 2003/0020616 A1 | 1/2003 | Graves |
| 2003/0031321 A1 | 2/2003 | Mages et al. |
| 2003/0033257 A1 | 2/2003 | Wankmueller |
| 2003/0034388 A1 | 2/2003 | Routhenstein et al. |
| 2003/0037262 A1 | 2/2003 | Hillhouse |
| 2003/0040927 A1 | 2/2003 | Sato et al. |
| 2003/0055780 A1 | 3/2003 | Hansen et al. |
| 2003/0055782 A1 | 3/2003 | Slater |
| 2003/0061168 A1 | 3/2003 | Routhenstein |
| 2003/0065624 A1 | 4/2003 | James et al. |
| 2003/0084002 A1 | 5/2003 | Ericson et al. |
| 2003/0085272 A1 | 5/2003 | Andrews et al. |
| 2003/0085286 A1 | 5/2003 | Kelley et al. |
| 2003/0105714 A1 | 6/2003 | Alarcon Luther et al. |
| 2003/0121969 A1 | 7/2003 | Wankmueller |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0149660 A1 | 8/2003 | Canfield |
| 2003/0154163 A1 | 8/2003 | Phillips et al. |
| 2003/0182246 A1 | 9/2003 | Johnson et al. |
| 2003/0187787 A1 | 10/2003 | Freund et al. |
| 2003/0195842 A1 | 10/2003 | Reece et al. |
| 2003/0200179 A1 | 10/2003 | Kwan |
| 2003/0213843 A1 | 11/2003 | Jackson |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0225623 A1 | 12/2003 | Wankmueller |
| 2003/0233327 A1 | 12/2003 | Keresman, III et al. |
| 2003/0236704 A1 | 12/2003 | Antonucci |
| 2004/0024693 A1 | 2/2004 | Lawrence |
| 2004/0049455 A1 | 3/2004 | Mohsenzadeh |
| 2004/0059952 A1 * | 3/2004 | Newport et al. ............ 713/202 |
| 2004/0064332 A1 | 4/2004 | Zou et al. |
| 2004/0088238 A1 | 5/2004 | Gilson et al. |
| 2004/0093303 A1 | 5/2004 | Picciallo et al. |
| 2004/0094624 A1 | 5/2004 | Fernandes et al. |
| 2004/0133787 A1 | 7/2004 | Doughty et al. |
| 2004/0153400 A1 | 8/2004 | Burke |
| 2004/0177045 A1 | 9/2004 | Brown |
| 2004/0193539 A1 | 9/2004 | Sullivan |
| 2004/0199474 A1 | 10/2004 | Ritter |
| 2004/0210498 A1 | 10/2004 | Freund et al. |
| 2004/0225880 A1 | 11/2004 | Mizrah |
| 2004/0230843 A1 | 11/2004 | Jansen |
| 2004/0232223 A1 | 11/2004 | Beenau et al. |
| 2004/0236688 A1 | 11/2004 | Bozeman et al. |
| 2004/0239481 A1 | 12/2004 | Beenau et al. |
| 2004/0242308 A1 | 12/2004 | Gray |
| 2004/0252012 A1 | 12/2004 | Beenau et al. |
| 2005/0021400 A1 | 1/2005 | Postrel et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0071637 A1 | 3/2005 | Shirakawa |
| 2005/0077349 A1 | 4/2005 | Bonalle et al. |
| 2005/0086160 A1 | 4/2005 | Wong |

| | | |
|---|---|---|
| 2005/0091492 A1 | 4/2005 | Benson et al. |
| 2005/0114883 A1 | 5/2005 | Nagai et al. |
| 2005/0116024 A1 | 6/2005 | Beenau et al. |
| 2005/0119979 A1 | 6/2005 | Murshita et al. |
| 2005/0121512 A1 | 6/2005 | Wankmueller |
| 2005/0125295 A1 | 6/2005 | Tidwell et al. |
| 2005/0127164 A1 | 6/2005 | Wankmueller |
| 2005/0137977 A1 | 6/2005 | Wankmueller |
| 2005/0167488 A1 | 8/2005 | Higgins et al. |
| 2005/0171842 A1 | 8/2005 | Tien et al. |
| 2005/0171905 A1 | 8/2005 | Wankmueller et al. |
| 2005/0179251 A1 | 8/2005 | Wagoner et al. |
| 2005/0189427 A1 | 9/2005 | Brown et al. |
| 2005/0193208 A1 | 9/2005 | Charrette, III et al. |
| 2005/0206499 A1 | 9/2005 | Fisher |
| 2005/0216888 A1 | 9/2005 | Drummond et al. |
| 2005/0289044 A1 | 12/2005 | Breslin et al. |
| 2005/0289052 A1 | 12/2005 | Wankmueller |
| 2006/0005039 A1 | 1/2006 | Hsieh |
| 2006/0020559 A1 | 1/2006 | Steinmetz |
| 2006/0031174 A1 | 2/2006 | Steinmetz |
| 2006/0036553 A1 | 2/2006 | Gupta et al. |
| 2006/0039733 A1 | 2/2006 | Meyerhofer |
| 2006/0081700 A1 | 4/2006 | Li |
| 2006/0116995 A1 | 6/2006 | Strayer et al. |
| 2006/0157557 A1 | 7/2006 | Lee et al. |
| 2006/0249574 A1 | 11/2006 | Brown et al. |
| 2006/0259766 A1 | 11/2006 | Rasti |
| 2006/0261927 A1 | 11/2006 | Kelly et al. |
| 2006/0269061 A1 | 11/2006 | Balasubramanian et al. |
| 2006/0282382 A1 | 12/2006 | Balasubramanian et al. |
| 2006/0289636 A1 | 12/2006 | Hoblit |
| 2007/0034700 A1 | 2/2007 | Poidomani et al. |
| 2007/0063025 A1 | 3/2007 | Blossom et al. |
| 2007/0067827 A1 | 3/2007 | Bhagavatula et al. |
| 2007/0118436 A1 | 5/2007 | McDowell |
| 2007/0136211 A1 | 6/2007 | Brown et al. |
| 2007/0180491 A1 | 8/2007 | Mevissen |
| 2007/0208671 A1 | 9/2007 | Brown et al. |
| 2007/0215688 A1 | 9/2007 | Routhenstein |
| 2007/0239622 A1 | 10/2007 | Routhenstein |
| 2007/0265924 A1 | 11/2007 | Beenau et al. |
| 2007/0290034 A1 | 12/2007 | Routhenstein |
| 2008/0005018 A1 | 1/2008 | Powell |
| 2008/0027841 A1 | 1/2008 | Eder |
| 2008/0029607 A1 | 2/2008 | Mullen |
| 2008/0035738 A1 | 2/2008 | Mullen |
| 2008/0046263 A1 | 2/2008 | Sager |
| 2008/0054068 A1 | 3/2008 | Mullen |
| 2008/0054079 A1 | 3/2008 | Mullen |
| 2008/0054081 A1 | 3/2008 | Mullen |
| 2008/0065555 A1 | 3/2008 | Mullen |
| 2008/0154770 A1 | 6/2008 | Rutherford |
| 2008/0230600 A1 | 9/2008 | Black et al. |
| 2008/0281722 A1 | 11/2008 | Balasubramanian et al. |
| 2008/0302869 A1 | 12/2008 | Mullen |
| 2008/0302876 A1 | 12/2008 | Mullen |
| 2009/0048972 A1 | 2/2009 | Bierer et al. |
| 2009/0100508 A1 | 4/2009 | Labaton |
| 2009/0119205 A1 | 5/2009 | Keresman, III et al. |
| 2009/0185687 A1 | 7/2009 | Wankmueller |
| 2009/0242645 A1 | 10/2009 | Komatsu et al. |
| 2009/0250522 A1 | 10/2009 | Williams et al. |
| 2009/0261161 A1 | 10/2009 | Blossom et al. |
| 2009/0265275 A1 | 10/2009 | Everhart et al. |
| 2009/0265460 A1 | 10/2009 | Balasubramanian et al. |
| 2009/0271853 A1 | 10/2009 | Everhart et al. |

FOREIGN PATENT DOCUMENTS

| | | |
|---|---|---|
| DE | 197 31 293 | 1/1999 |
| DE | 102006015818 | 10/2007 |
| EP | 0 590 861 | 4/1996 |
| EP | 0855659 | 7/1998 |
| EP | 0884877 | 12/1998 |
| GB | 2275654 A | 9/1994 |
| JP | 64-87397 | 3/1989 |
| JP | 8-080680 | 3/1996 |
| JP | 8-096098 | 4/1996 |
| JP | 2005-246658 | 9/2005 |
| WO | WO 91/16691 | 10/1991 |
| WO | WO 93/08545 | 4/1993 |
| WO | WO 96/08783 | 3/1996 |
| WO | 97-20692 | 6/1997 |
| WO | 98-10368 | 3/1998 |
| WO | 98/37524 | 8/1998 |
| WO | 00/62458 | 10/2000 |
| WO | 01-18699 | 3/2001 |
| WO | 01-88659 | 11/2001 |
| WO | 2005-101975 | 11/2005 |
| WO | 2006-060370 | 6/2006 |
| WO | WO 2006/081525 A3 | 8/2006 |
| WO | 2006-105092 | 10/2006 |
| WO | 2006-116772 | 11/2006 |
| WO | 2007-115725 | 10/2007 |
| WO | 2008-021382 | 2/2008 |

OTHER PUBLICATIONS

Visa & Carnegie Mellon Plan Online Payment Scheme, Newsbyte News Network, Feb. 15, 1995.
Song, "A Card That Asks For ID," Monday, Apr. 12, 2004, Time Magazine Article, 1 page.
MailFrontier Survey Finds that Consumers Hold Financial Institutions Accountable for Online Identity Theft, MailFrontier™, dated Nov. 10, 2004, Palo Alto, California, www.mailfrontier.com.
"A Card That Asks For ID," by Sora Song, dated Monday, Apr. 12, 2004, Time Magazine Article.
S.P. Miller, B.C. Neuman, J.I. Schiller, and J.H. Saltzer, Section E.2.1:Kerberos Authentication and Authorization System, M.I.T. Project Athena, Cambridge, Massachusetts (Dec. 21, 1987).
Rachel Konrad, IBM had a bunch of unusual ideas in 2003, Philly. com, posted on Tue., Jan. 13, 2004, printed Jan. 21, 2004, 2 pages, <http://www.philly.com/mld/philly/2004/01/13/business/7695405. htm?template=contentMo...>.
"Daily Payment Card News," CardFlash at CardWeb.com, Oct. 13, 2005 (3 pages).
Gamble, R. "There's A New Wildcard for Payables," Treasury & Risk Management, Sep. 2006 (3 pages).
Evers, J. "A password for your credit cards," CNET news, Aug. 2, 2006 (2 pages).
"Visa takes step with digital display card," CardLine, Dec. 5, 2006 (1 page).
"Paypal sells anti-fraud token," CardLine, Feb. 12, 2007 (1 page).
Shankar, U., et al. "Side effects are not sufficient to authenticate software," 13th USENIX Security Symposium, Aug. 2004, pp. 89-101 (13 pages).
Kennell, R., "Establishing the Genuinity of Remote Computer Systems," 12th USENIX Security Symposium, Aug. 2003, pp. 295-310 (17 pages).
Kingson, J., "Banks test ID device for online security," The New York Times, Dec. 23, 2004, (3 pages).
"Caesar cipher," Answers.com, http://www.answers.com/topic/caesar-cipher (9 pages).
"Web of deceit," Analysis: Finextra Research, Mar. 11, 2005 (2 pages).
Schwartz, J., "Graduate Cryptographers Unlock Code of 'Thiefproof' Car Key," The New York Times, Jan. 29, 2005, (3 pages).
Lemos, R. "Two-factor authentication won't stop ID theft," silicon. com, Mar. 16, 2005 (2 pages).
"Online fraud," CardFlash, Apr. 26, 2005 (1 page).
"Handy future for online security," BBC News, Oct. 17, 2002 (2 pages).
Zdancewic, S. et al. "Secure Program Partitioning" Computer Science Department, Cornell University, Oct. 18, 2001 (35 pages).

Graham-Rowe, D. "Security hole closes Microsoft Passport" Nov. 2001 (1 page).
McLellan, V., "Re: Token based OTP: SafeWord or SecurlD?" Dec. 6, 2000 (6 pages).
Crawford, J. "Paying with RFID, Smart Cards, And Biometrics," 2002 (4 pages).
Dam, K. et al. "Cryptography's Role in Securing the Information Society," Committee to Study National Cryptography Policy, National Research Council 1996 (24 pages).
Smart Cards Big Brother's Little Helpers, The Privacy Committe of New South Wales, No. 66, Aug. 1995.
Award Card Comparison, JA7922, Nov. 1, 1995.
Card Based Award Systems, JA8309, Nov. 1, 1995.
Meridian-the leader in card marketing, JA8343 (1995).
Meridicard vs. Debit Cards, JA7917 (1995).
John N. Frank, Beyond Direct Mail, Credit Card Management, vol. 9, Issue 5, Aug. 1996, 4 pages.
Incentive Cards Explained, Incentive, Dec. 1995, 5 pages.
The Power of the Card, Incentive, Jul. 1997, 6 pages.
Incentive gift Card Another way to give the gift of choice!, Incentive, Aug. 1995, 2 pages.
Paper or Plastic? With these three incentives, The Choice is Yours, Incentive, Feb. 1996, 2 pages.
Overview of Smart Cards and the Industry, Smart Cards Seizing Strategic Business Opportunities, Chapter 1, p. 2-20, Irwin Professional Publishing, 1997.
A Tangled World Wide Web of Security Issues, First Monday, retrieved from the internet at http//www.firstmonday.org/issues/issue7_3/claessens, retrieved from the internet on Oct. 6, 2006.
Electronic Payment System, 1997, Artech House, XP002137255, p. 7-11.
Definition of Store-Value Card, Wikipedia, retrieved from the internet at http//en.wikipedia.org/wiki/Stored-value_card, retrieved from the internet on Apr. 16, 2007.
Jazzy Jeff, Credit Card Commentaries cardoffers.com (2003).
Kmart Mastercard - cardweb.com (2000).
Debit and Stored Value Cards for Government: A Growing Trend but States Could Do More, A Survey and White paper of The EBT Industry Council, Nov. 2006.
Abstract to 2007 JPMorgan Chase Disaster Response Card National Strategy Plan Abstract, Jan. 20, 2007.
Wenninger et al., The Electronic Purse, Current Issues in Economics and Finance, vol. 1, No. 1, Apr. 1995, acs00098037.
Authorization of Financial Agent and Terms of Performance, Debit Card Application for Houston, Texas, Sep. 1991, acs00277412.
Debit Card Services - Invitation for Expressions of Interest, Jul. 1991, acs00277422.
Direct Payment Card, International EBT Pilot Evaluation Pilot Evaluation - Argentina, Jan. 1996, acs00277456.
Coca-Cola ATM Money Cards, ACS 012, Apr. 8, 2009.
Price, Joanne et al. U.S. Appl. No. 60/133,577 May 11, 1999.
Digital Signatures - An Overview pp. 87-94 (1979).
Gallant, The Hartford Offers Quick Claim Payment Solution For Customers In Katrina's Path, Sep. 15, 2005.
Kilian-Kehr, Mobile Security with Smartcards, Dissertation, Apr. 8, 2002.
Youll, Peer to Peer Transactions in Agent Mediated Electronic Commerce, Aug. 10, 2001.
Rankl, Smart Card Handbook, Second Edition (1999).
Stiffened Card with Integrated Circuit, Aug. 1986.
Image-based transaction processing The banking industry's challenge for the 1990s and beyond (1989) acs01039270.
Innovative Credit Card Fashions Take Hold Customized Plastic Good for Firms but Users Should Beware, Jun. 13, 1996.
A Case Study of Authenticated and Secure File Transfer The Iowa Campaign Finance Reporting System (1997).
Information Processor Personal Computer PC has Message Display Unit Which Displays Message Stored in Help Table Corresponding to Indicated Button When Event Process Unit Detects that there is Indication to Button Selected to Override, Aug. 29, 1997.
Debit Card News - Paperless Trail Leads Debit to a Check-Free Payroll Program, vol. 3, No. 12, Dec. 16, 1997.
Kiwi Card Converts Unlikely to Lead Smart Revolution Little Support for Changes to Risk Allocation, Apr. 25, 2000.
American Express and Starwood Launch The New Starwood Preferred Guest SM Credit Card from American Express, Jun. 19, 2001.
ViVOtech, Inc. RF-Based Contacdess Payment A more convenient way to pay, Apr. 2004.
Yee, Using Secure Coprocessors, School of Computer Science Carnegie Mellon University, May 1994.

* cited by examiner

US 7,899,753 B1

SYSTEMS AND METHODS FOR TIME VARIABLE FINANCIAL AUTHENTICATION

This application is a continuation-in-part application (CIP) of U.S. application Ser. No. 10/105,471 filed Mar. 25, 2002, now abandoned which is incorporated herein by reference in its entirety.

BACKGROUND OF THE INVENTION

The present invention relates to systems and methods to perform authentication of a transaction between a requesting entity, in particular a customer, and an authenticating authority.

Since the ancient invention of money, problems of counterfeiting have existed. These problems have led to ever more sophisticated measures to make the injection of false tokens, representing value, from successfully being used in a transaction. When in much more recent times credit cards were introduced, such measures were incorporated. For example, in earlier times, only a check digit formed by a secret algorithm was used to validate card numbers, the number space being very sparsely occupied so that the chance of finding a valid card number was relatively low. Then thieves learned how to forge this digit. As a result secret cryptography-based codes were added to the cards and checked by the card issuer when charges to an account were made. These measures have been useful in reducing fraud until recently.

However, with the practice of merchants storing card numbers, including some of the codes, insecurely on the Internet, there have been enough thefts of these numbers so that fraud is becoming an increasingly difficult problem. Such fraud often occurs in cases where the cards are not physically present. Fraud is reduced somewhat where the card is physically present. That is, credit cards contain fraud avoidance devices like holograms which make counterfeiting of physical cards more difficult than counterfeiting numbers off the cards.

Further, rules designed to prohibit storing the secret codes have been ignored, even by large issuers and as a result a new way to prevent fraudulent card use for remote customers is becoming necessary. Smart cards using public key encryption have been introduced, but these have met with little acceptance, due to their need for gadgetry to read them, which is not widely available.

Known techniques in the area of time based codes reach back to ancient times, when the password of the day was common in military camps. The notion of using widely synchronized times to control functions dates at least to the philosophy of Gottfried Liebniz (coinventor of the calculus and a contemporary of Isaac Newton). During World War II, codebooks valid for a particular day were used by both sides. The use of time stamps in computer communication is almost as old as computing. An example of their use in authentication can be found in the Kerberos system (MIT, 1987). Financial transactions have been timestamped to avoid replay problems also.

However, known techniques fail to provide an approach to effectively use the advance of time as an effective authentication mechanism. The present invention addresses the above, as well as other problems, that are present in known techniques.

BRIEF SUMMARY OF THE INVENTION

The systems and methods of the invention provide a technique for authenticating a finance related transaction. The method may include providing a token which contains a token counter, the token counter periodically advancing to generate a changing token value, the token counter being synchronized to a base counter that generates an authenticating value; transforming the token value into a token output sequence using logic; and outputting at least part of the token output sequence to an authenticating authority, the authenticating authority having access to the authenticating value. Further, the method includes the authenticating authority verifying the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
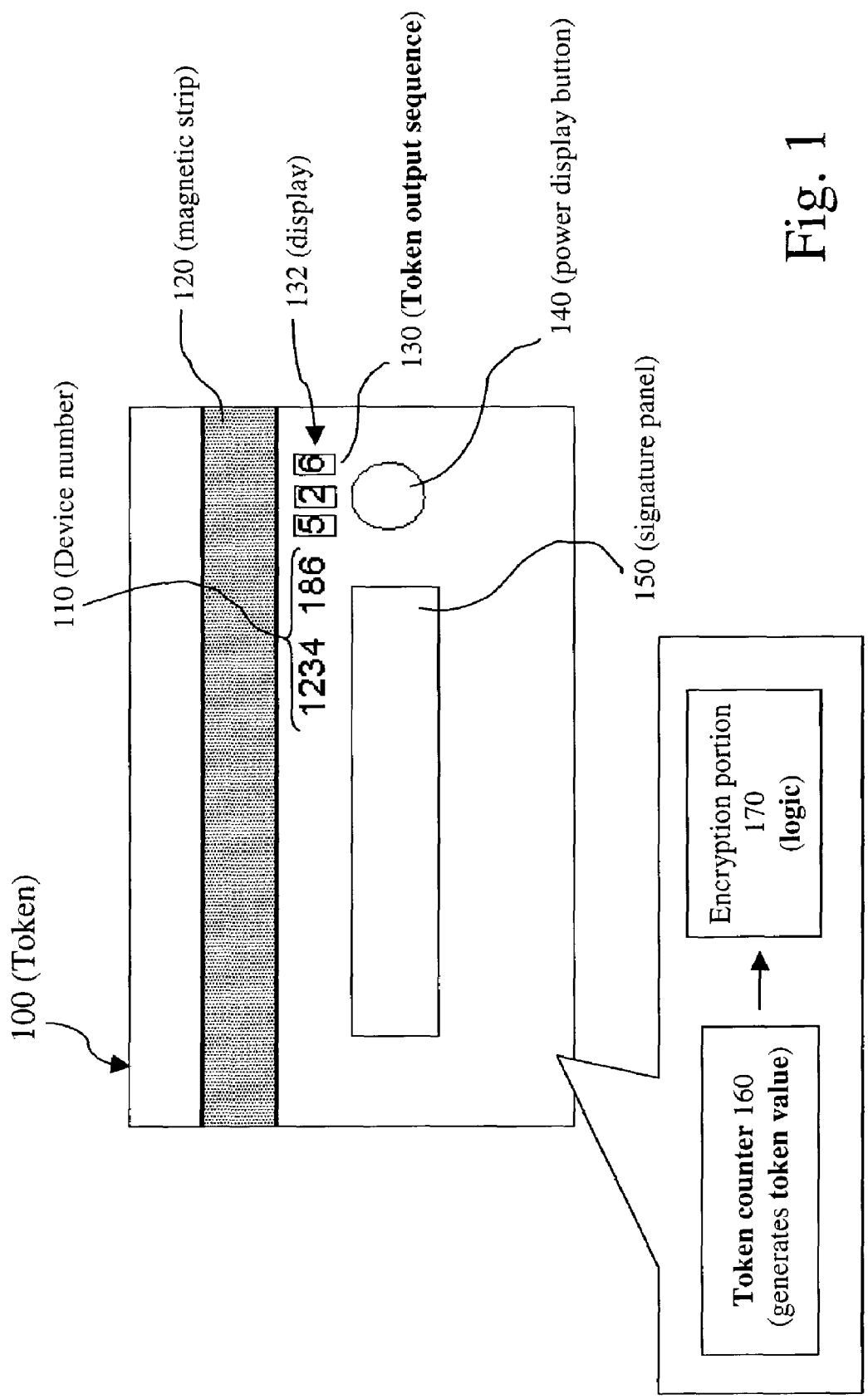
FIG. 1 is a diagram showing a token in accordance with one embodiment of the invention.

Hereinafter, features in accordance with various embodiments of the invention will be described. As used herein, any term in the singular may be interpreted to be in the plural, and alternatively, any term in the plural may be interpreted to be in the singular.

The present invention supplies a display on a consumer device, in accordance with one embodiment of the invention. The display displays an authentication code that varies with time. The "time" is synchronized to a known base time. An authenticating authority, such as the issuer for credit cards for example, can determine whether the correct code is being sent to it for a particular consumer device and for a particular transaction time. The time variability is obscured by a secret process on the consumer device to prevent those not in possession of the secret process from figuring out the code sequence. As a result, the authenticating authority can decide whether the requested transaction comes from a valid source. Because the display number is variable, it cannot be recorded on the Internet or elsewhere in a form useful for theft, save for very limited durations. Further such recorded numbers cannot be used to aid in impersonating a holder of a consumer device, e.g., a credit card, for purposes of identity theft. Widespread use of this invention will make telephone, network, or other remote commerce safer for all involved.

The token, in accordance with one embodiment of the invention, may be issued by an authenticating authority. An "authenticating authority" as used herein means either a central authority or a distributed authority, for example. The authenticating authority is capable of deciding whether to authorize transactions where a token is provided as a way to check the validity of authorizations, i.e., to permit them. The authenticating authority possesses authority to perform transactions in the scope of the invention including authority to effect a payment or authorize some other financial or financial-related transaction In accordance with one embodiment of the invention, the invention uses what might be characterized as a token. The token is used to indicate authority to perform transactions. The token includes a token clock or token counter that can maintain synchronization with a reference clock, i.e., a base counter, during the lifetime of the token. This synchronization might be maintained to within one or a few times the interval between changes of identifier. In accordance with one embodiment of the invention, this might include a counter which "ticks", i.e., changes value, one or a few times per day, for example.

Further, the token also includes a device or mechanism for performing a secret transform on the clock value. In accordance with one embodiment of the invention, this transformation might also involve some other separately observable attribute of the token, such as the credit card number or a cellular phone number. The token uses the secret transform, which is not available to the token holder, but that is reproducible by an authenticating authority. Further, the secret may be different for every such token so that if one is lost, only its secret is lost and other tokens remain secure. The result of this transform, or part of the result of the transform, is displayed by the token in such a way that the displayed number can be read by a person or device, i.e., whatever might read the token, and transmitted to an authenticating authority. Optionally, such an authority might demand that additional memorized digits or some other identifying indicia be supplied. This other indicia would further preclude use of a stolen token. That is, the token as described herein may be used with any other known authentication technique, as desired.

In accordance with one embodiment of the invention, the invention may be in the form so as to resemble a credit card. In addition to the existing credit card fields, i.e., such as magnetic stripe, for example, the card in accordance with one embodiment of the invention is provided with a small processor and battery. Further, the card includes a display that is visible on the card. The display shows a few digits computed by a secret process on the card. One such implementation might take a secret master key known to the issuer and encrypt the card account number and expiration with this master key. This diversified key then gets stored on the card. Further, it is noted that the diversified key may be different for each card.

As noted above, a clock computes a value that is transformed and then displayed on the token. That is, the token first reads the clock. The clock may be in the form of a counter of some type. For example, the clock for a certain batch of credit cards might advance based on the "hours since midnight on Jan. 1, 2001". Further, the credit cards might be synchronized when issued. In accordance with one embodiment of the invention, the initial value generated by the clock is encrypted with the diversified key.

Further, only the low three decimal digits of the result are displayed on the display, for example, in accordance with one embodiment of the invention. Of course, it is appreciated that any number of digits or selection of digits may be used, as is desired. Physically, the invention will not pose a problem since there currently exists flexible numeric displays much thinner than credit cards. Should power be limited to drive such a display all the time for a few years, a pushbutton or other switch might be present to conserve power.

When the credit card holder of the token of the invention makes a phone purchase or a net purchase, for example, he or she then reads the display, and possibly recites some other digits she is given to retain or memorize, in accordance with one embodiment of the invention. For example, such other digits might be the fixed CVV code (card validation value) on the back of the credit card. The credit card holder then furnishes such information to a merchant. The merchant then sends the information to the issuer, or some other authenticating authority, for validation.

The authenticating authority receives the card number, timestamp of the transaction, the token value and any added data. The authenticating authority then derives the diversified key from the card number and the master secret the particular card holds and/or reads such information from storage. Further, the authenticating authority checks the timestamp supplied for sanity, i.e., performs a crude reasonableness test, and uses the timestamp to derive the expected on-card clock value. The authenticating authority then encrypts this clock value with the diversified key and compares with the value supplied by the customer.

So as to avoid clock drift problems, the authenticating authority may compare adjacent timeslot values for the comparison operation. The authenticating authority then treats these adjacent timeslot values as matches if one of them produces the same code as was reported. The exact number of these comparisons depends on expected maximum clock drift on card over the card lifetime, i.e., two to three years, for example, and may be varied as desired. For example if it is expected the clock might drift under an hour, and the clock changes value at midnight, then transactions after 11 PM might be compared also with the next day's code, and similarly transactions before 1 AM might be compared with the prior day's code. In this way the card user never sees any effects of the clock changing during his transaction.

In accordance with further aspects of the invention, as noted above, a variety of other values may be supplied to a token holder for use in authenticating transactions. These other values can be recorded by the authenticating authority, or alternatively, can be computed by such an operation as encrypting the card number with a second secret key and using part of such resulting number. This additional number is entered when making a transaction, along with the displayed number, by the cardholder. Such added information makes a token less useful to someone who stole the token, as they would have to guess the correct check digits or digits to fool the authenticating authority.

Further, it may be desirable for the values, which the token displays, to be related mathematically to some separate observable about the token, e.g., such as a cellular phone number. For example, a second identifier built into the token may be used mathematically for computation of the value displayed by the display on the token. For tokens of the nature of credit cards, the preferred implementation encrypts the card number. For tokens like cell phones, there is a phone ID number which could be used. Such practice would make it harder to forge tokens and will be found to be of particular use for tokens in which the internal state cannot be hidden well from users, i.e., the internal state meaning a cell phone number, for example. In those cases where the internal state cannot be hidden, it may be desired to use other identifiers, in addition to the token value described herein, in order to gain the added protection against fraud.

As described herein, one embodiment of the invention uses a token resembling a credit card. However, any of a wide variety of tokens may be used. Accordingly, as used herein a "token" means a device which is presented or which bears information which is presented by someone to set up a payment or similarly authorize some financial or financial-related transaction. Accordingly, a token of the invention may be in a wide variety of forms including a token in the form of a credit card, or a gasoline-buying "speedpass," for example. Accordingly, the token in the invention may be in the form of credit card or debit card type device possessing a display to be read by the cardholder, a credit card type device having a magnetic strip, a radio frequency generating device, an infrared signal generating device, an audio signal generating device, a magnetic pattern generating device, and/or other devices for outputting a data signal, i.e., such as a PDA (personal digital assistance) outputting a data signal to a computer or to a cashier, for example.

Further, as described herein, the token of the invention generates a "display." As used herein, a "display" means whatever sends information off the token for authentication checks. For credit card type tokens, the display might be some visible display. For other types of tokens, the display might be a radio or audio signal, or magnetic patterns, for example. Accordingly, a "display" in a token of the invention may illustratively be an LED (light emitting diode), an LCD (liquid crystal display), a magnetic strip, a radio frequency signal, an infrared signal, an audio signal, a magnetic pattern, any other data signal, or any other technique that may be used to convey information from the token to the merchant, and in turn to the authenticating authority, for example. As is appreciated, interim steps may be needed such as a human cardholder reading the token output sequence and inputting the token output sequence into a computer via a keyboard or to a human merchant verbally, for example.

As described in various examples herein, the token of the invention may be used in an interaction between a customer and a merchant. However, the token of the invention may be used in a variety of other situations between any of a wide variety of entities. For example, the treasurer of a corporation might use the token described herein to validate instructions to a bank, i.e., regarding a desired transaction, for example. Accordingly, the token of the invention might be used in conjunction with transactions between two banks or between any other institutions or entities, for example.

The checking is preferably done off the token, although a central authority's processing might be replaced in some cases by some combination of other processing with perhaps other tokens whose trust is established in other ways, e.g., such as biometrics, for example, to allow local checking of such tokens for authenticity. That is, the token of the invention may well be used in conjunction with other authentication checks, such as simply a credit card number, for example; and the authenticating authority may be made up of separate portions so as to collectively perform the verification process.

Hereinafter, further aspects of the systems and methods of the invention will be described with reference to the drawings. FIG. 1 is a diagram showing a token 100 in accordance with one embodiment of the invention. As shown in FIG. 1, the token 100 includes a device number 110. While the token 100 is shown in FIG. 1 as being similar to a credit card, it is appreciated that the token 100 may be in any of a wide variety of shapes and sizes.

As shown in FIG. 1, the token 100 also includes a magnetic strip 120. Further, the token 100 includes a token output sequence 130, i.e., a number, that is presented by a display 132. The token output sequence 130 is generated by the token 100 based on the progression of a clock, as described above, for example. In order to conserve energy of the token 100, the token output sequence 130 might not be displayed at all times. That is, the holder of the token 100, in accordance with one embodiment of the invention, presses the power display button 140 to display the token output sequence 130. Such action results in a token output sequence being displayed and visible to the holder. As shown in FIG. 1, the token 100 may also include a signature panel 150 to provide further verification of the veracity of the holder.

To explain further, the token output sequence 130 is generated using a token counter 160. The token counter 160 generates a token value. This token value is output within a token 100 to an encryption portion 170. The encryption portion 170 provides logic to process the token value to result in the token output sequence 130. Both the progression of the token counter 160 as well as the logic used in the encryption portion 170 is known and simulated by a verification or authenticating authority so as to verify a transaction by the holder of the token 100.

The embodiment of FIG. 1 utilizes a display 132 to display the token output sequence 130. However, is appreciated that the token output sequence 130 may be displayed using a variety of techniques, as is further described below. For example, the token output sequence 130 might be input into the magnetic strip 120, i.e., so as to be output to a merchant, for example.

Figure 2:
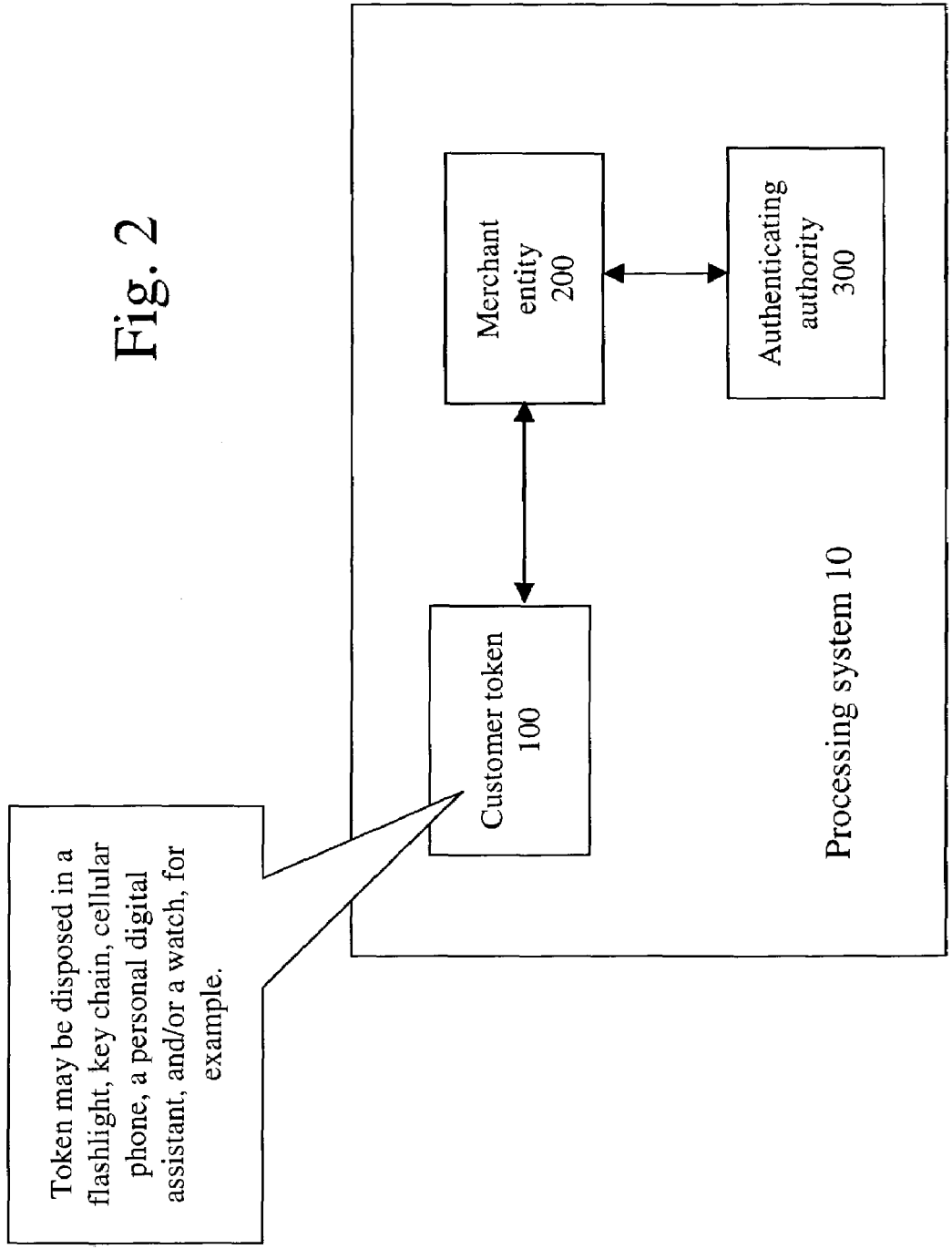
FIG. 2 is a block diagram showing a processing system in accordance with one embodiment of the invention.

FIG. 2 is a block diagram showing a processing system 10 in accordance with one embodiment of the invention. As shown in FIG. 2, the processing system 10 includes a customer token 100. Further, the processing system 10 includes a merchant entity 200 and an authenticating authority 300.

In accordance with one embodiment of the invention, the customer token 100 takes the form of the device shown in FIG. 1. Further, the merchant entity 200 may be in any of a wide variety of forms such as merchant disposed in a physical merchant store, an internet entity, a receiver such as on a toll road device, a telephone entity, as well as a wide variety of other arrangements, as should be appreciated. Further, as shown in FIG. 2, the token 100 may be disposed in a variety of devices, such as in a flashlight, key chain, cellular phone, a personal digital assistant, and/or a watch, for example.

Figure 3:
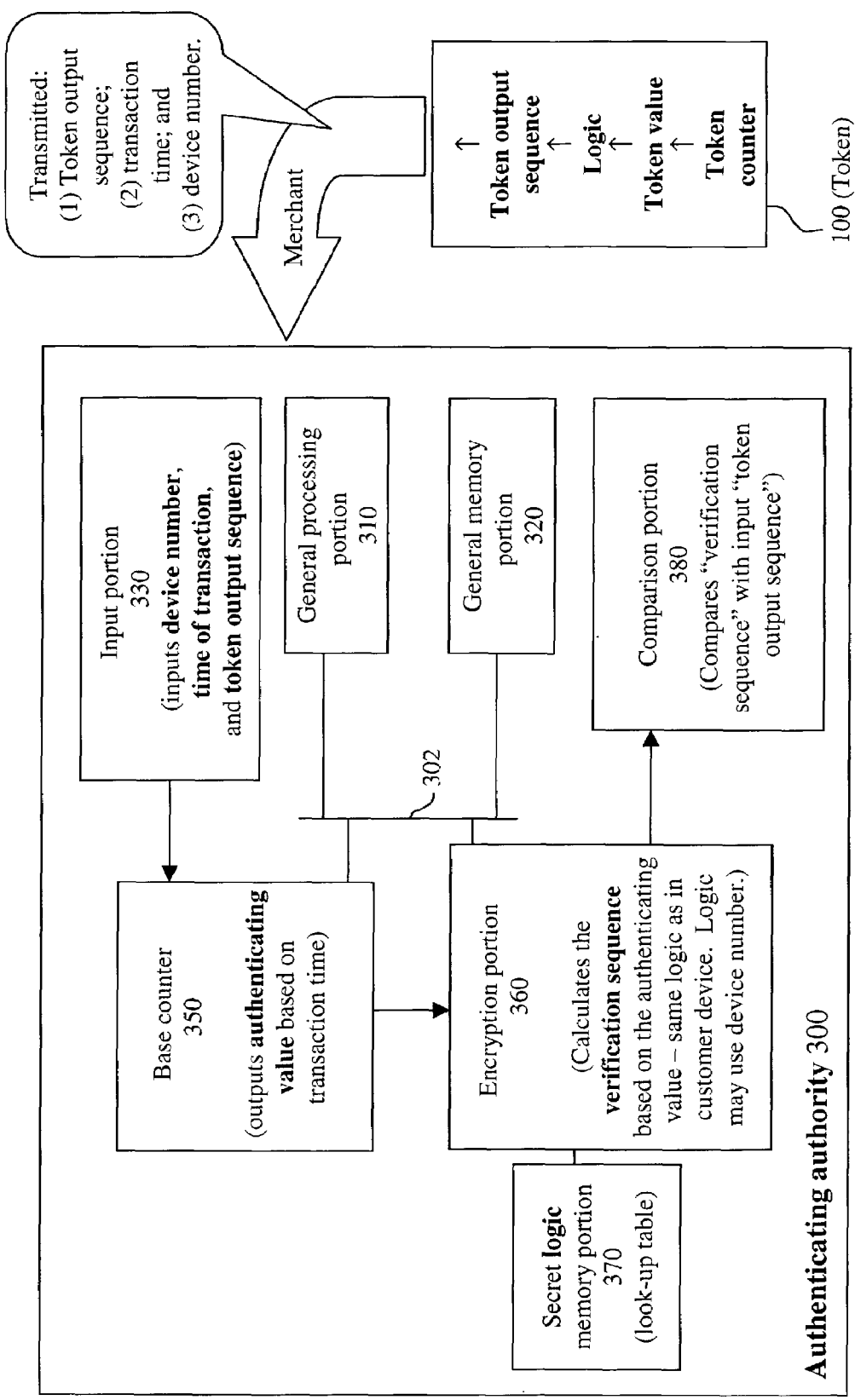
FIG. 3 is a block diagram showing an authenticating authority in accordance with one embodiment of the invention.

FIG. 3 is a block diagram showing in further detail the authenticating authority 300. The authenticating authority 300 includes a general processing portion 310 and a general memory portion 320. The general processing portion 310 controls overall operations of the various components disposed in the authenticating authority 300. Further, the general memory portion 320 provides a wide variety of memory resources to the authenticating authority 300.

The authenticating authority 300 further includes an input portion 330. The input portion 330 inputs information necessary to verify a transaction performed using the token 100. Illustratively, the input portion 330 inputs a device number from a token, the time the transaction, as well as a token output sequence. The authenticating authority 300 further includes a base counter 350. The base counter 350 outputs an authenticating value based on the transaction time, which is received from the token 100. This authenticating value is created using processing performed in parallel to the token counter 160. Specifically, the base counter 350 simulates the output that the token counter 160 would have generated at the time of the transaction.

Further, the authenticating authority 300 includes an encryption portion 360. The encryption portion 360 calculates a verification sequence in the same secret logic as in the token 100. In the authenticating authority 300, the encryption portion 360 operates in conjunction with the secret logic memory portion 370 to generate the verification sequence. For example, the secret logic memory portion might use the device number to determine which logic to apply to the verification sequence, e.g., using a look-up table, for example.

In accordance with one embodiment of the invention, it is noted that the logic might use the device number in mathematical processing of the authenticating value, or, in the token, the logic might use the device number in mathematical processing of the token value.

Further, the authenticating authority 300 includes a comparison portion 380. The comparison portion 380 uses the verification sequence, which is generated within the authenticating authority 300, and compares such verification sequence with the input "token output sequence," which is input from the token 100.

Figure 4:
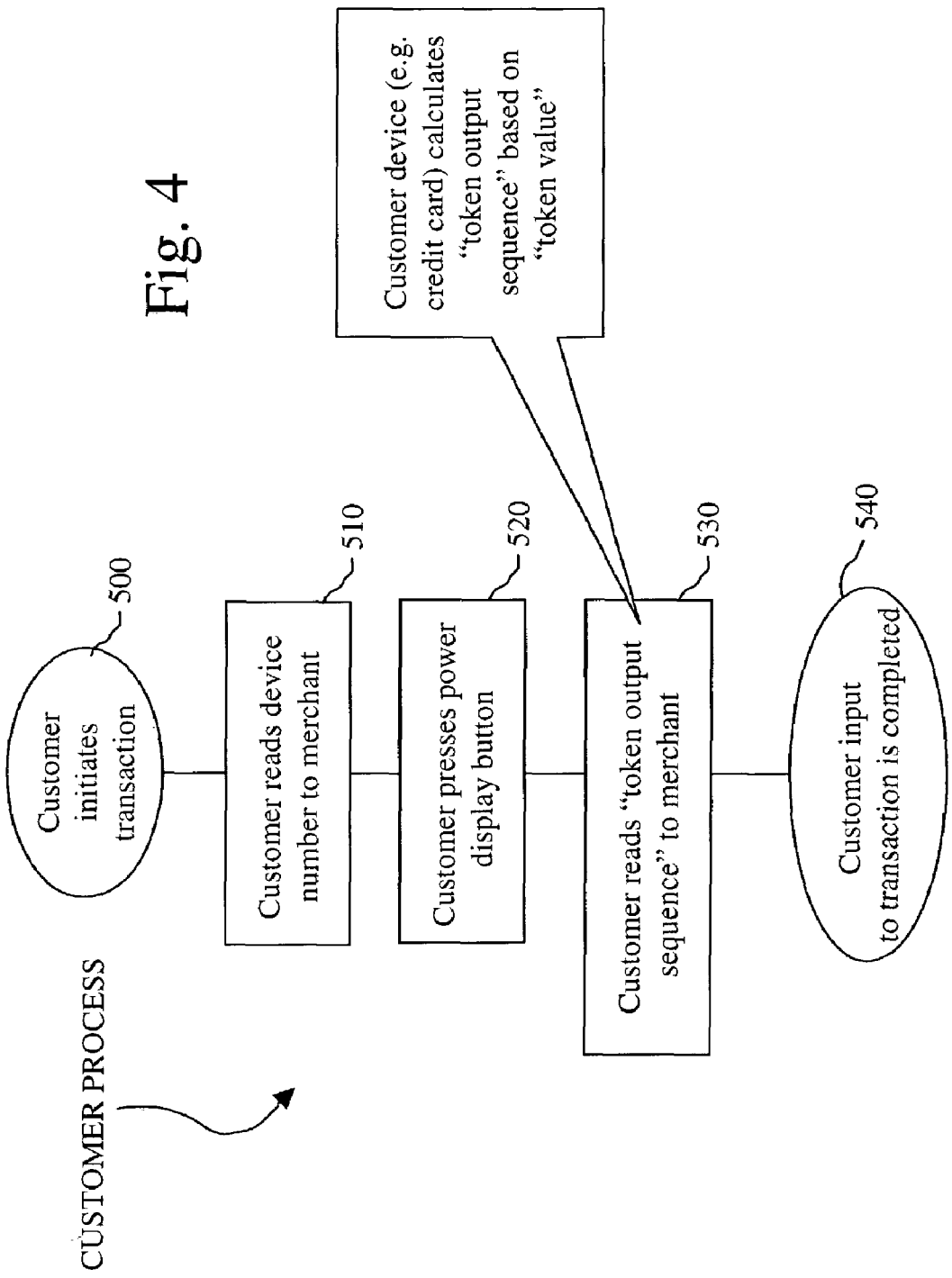
FIG. 4 is a flowchart showing a "customer initiates transaction" process in accordance with one embodiment of the invention.

FIG. 4 is a flow chart showing a customer process in accordance with one embodiment of the invention. As shown in FIG. 4, the process starts in step 500 in which the customer initiates a transaction. After step 500, the process passes to step 510. In step 510, the customer reads, or in some other manner conveys, the device number to the merchant. Then, in step 520, with reference to the embodiment of the invention shown in FIG. 1, the customer presses the power display button. As a result, the token output sequence is displayed for viewing by the customer. Accordingly, in step 530, the customer reads the token output sequence to the merchant. In conjunction with step 530, the customer device, i.e., the token 100, for example, calculates the token output sequence based on a token value generated in the token, i.e., based on the progression of the clock in the token. After step 530 of FIG. 4, the process passes to step 540. In step 540, the customer input to the transaction is completed.

Figure 5:
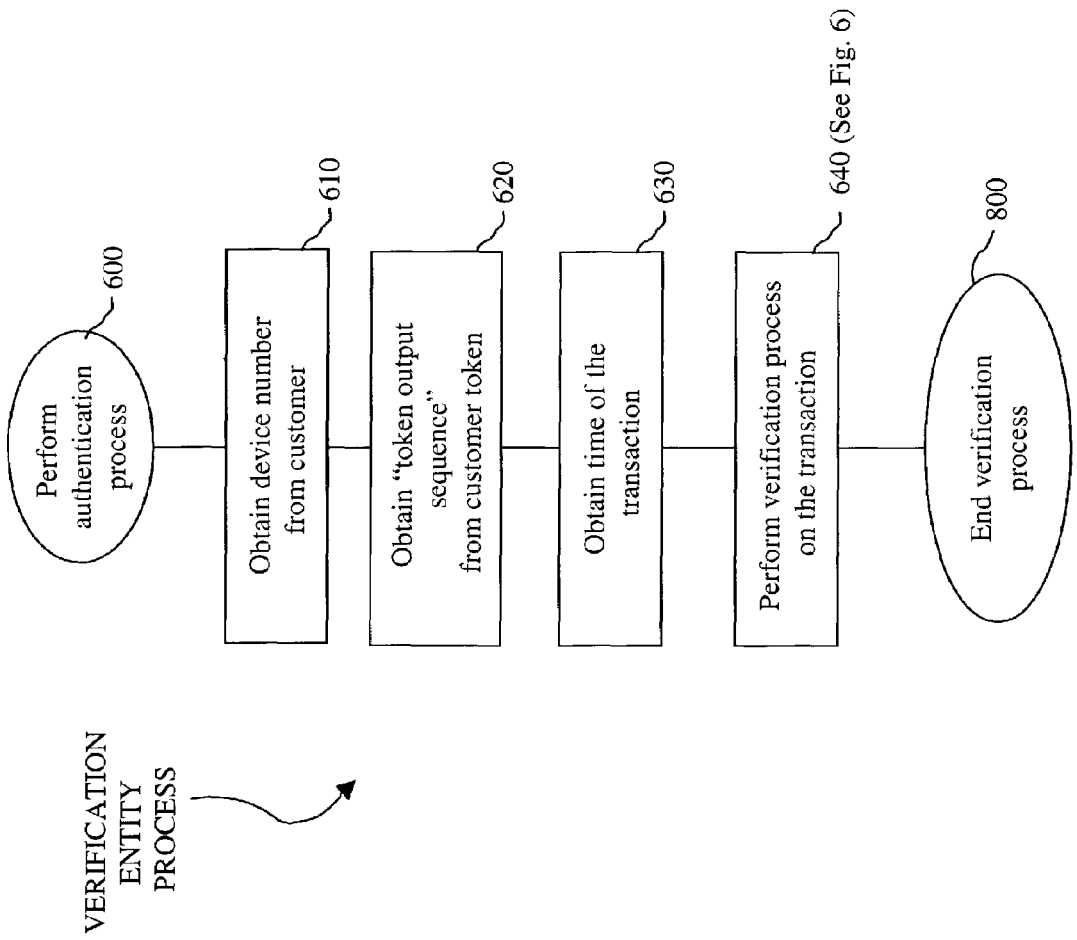
FIG. 5 is a flowchart showing the "perform authentication process" in accordance with one embodiment of the invention.

FIG. 5 is a flow chart showing an authenticating authority process in accordance with one embodiment of the invention. As shown in FIG. 5, the process starts in step 600 and passes to step 610. In step 610, the authenticating authority obtains the device number from the customer. Then, in step 620, the authenticating authority obtains the token output sequence number from the customer. After 620, the process passes to step 630. In step 630, the authenticating authority also inputs the time of the transaction, i.e., which may be obtained from the merchant in accordance with one embodiment of the invention. Accordingly, each of the items of information input in steps 610, 620 and 630 are obtained from the customer and/or the merchant and may typically be transmitted from the customer through the merchant so as to be input by the authenticating authority.

Figure 6:
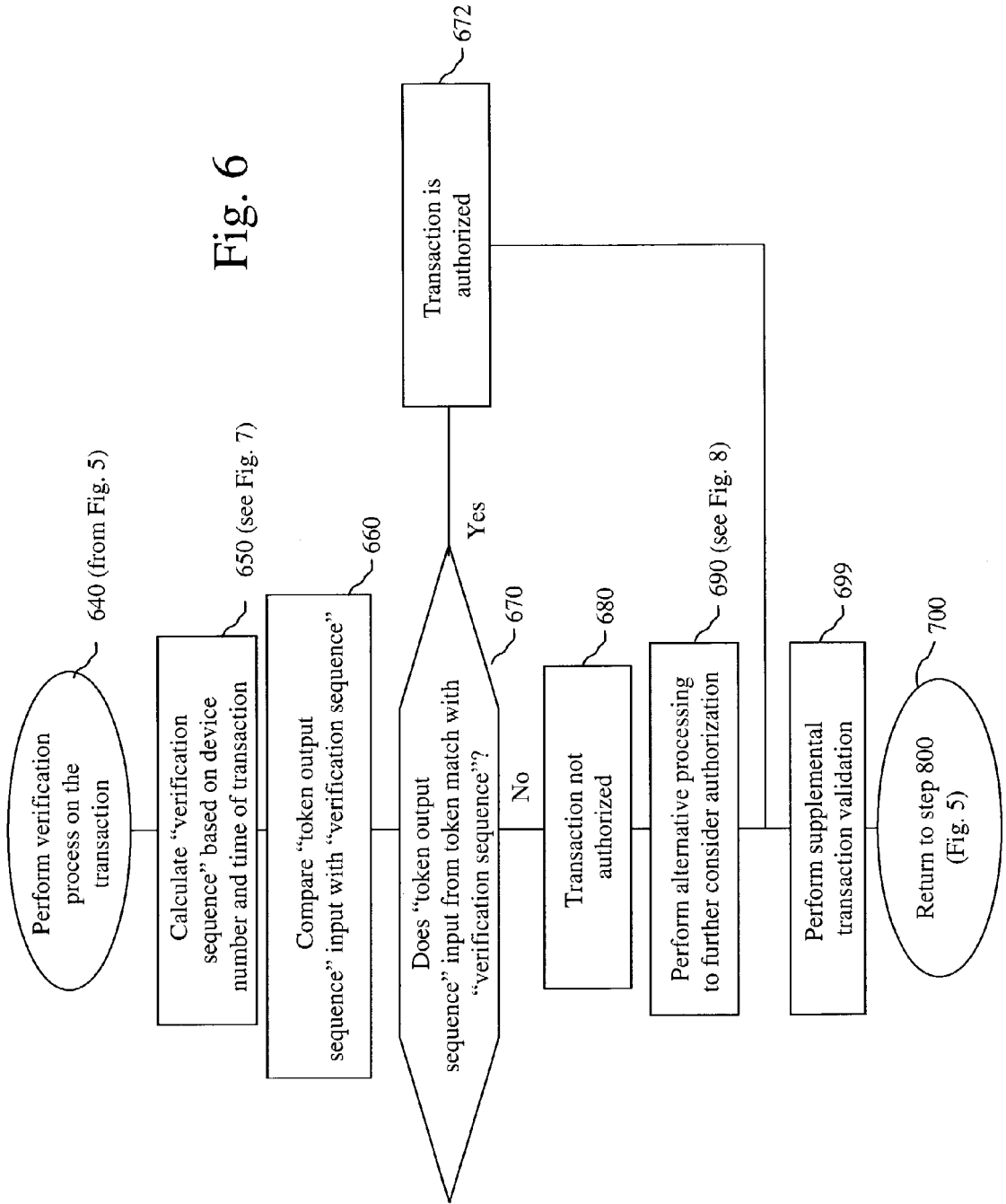
FIG. 6 is a flowchart showing the "perform verification process on the transaction" step of FIG. 5 in accordance with one embodiment of the invention.

Returning to FIG. 5, after step 630, the process passes to step 640. In step 640, the authenticating authority performs a verification process on the transaction. FIG. 6 is a flowchart showing in further detail step 640. After step 640 of FIG. 5, the process passes to step 800. In step 800, the verification process is completed.

As noted above, FIG. 6 is a flowchart showing in further detail the "perform verification process on the transaction." As shown in FIG. 6, the process starts in step 640 and passes to step 650. In step 650, the process, i.e., performed by the authenticating authority, calculates a "verification sequence" based on the device number and the time of transaction, which has been input. Then, in step 660, the authenticating authority compares the "token output sequence" input from the customer with the "verification sequence". After step 650, the process passes to step 670.

In step 670, as shown in FIG. 6, the process determines whether the token output sequence that is input from the customer matches with the verification sequence that is generated within the authenticating authority. If yes, i.e., there is a match, then the process passes to step 672. In step 672, the transaction is authorized. After step 672, the process passes to step 699.

Figure 8:
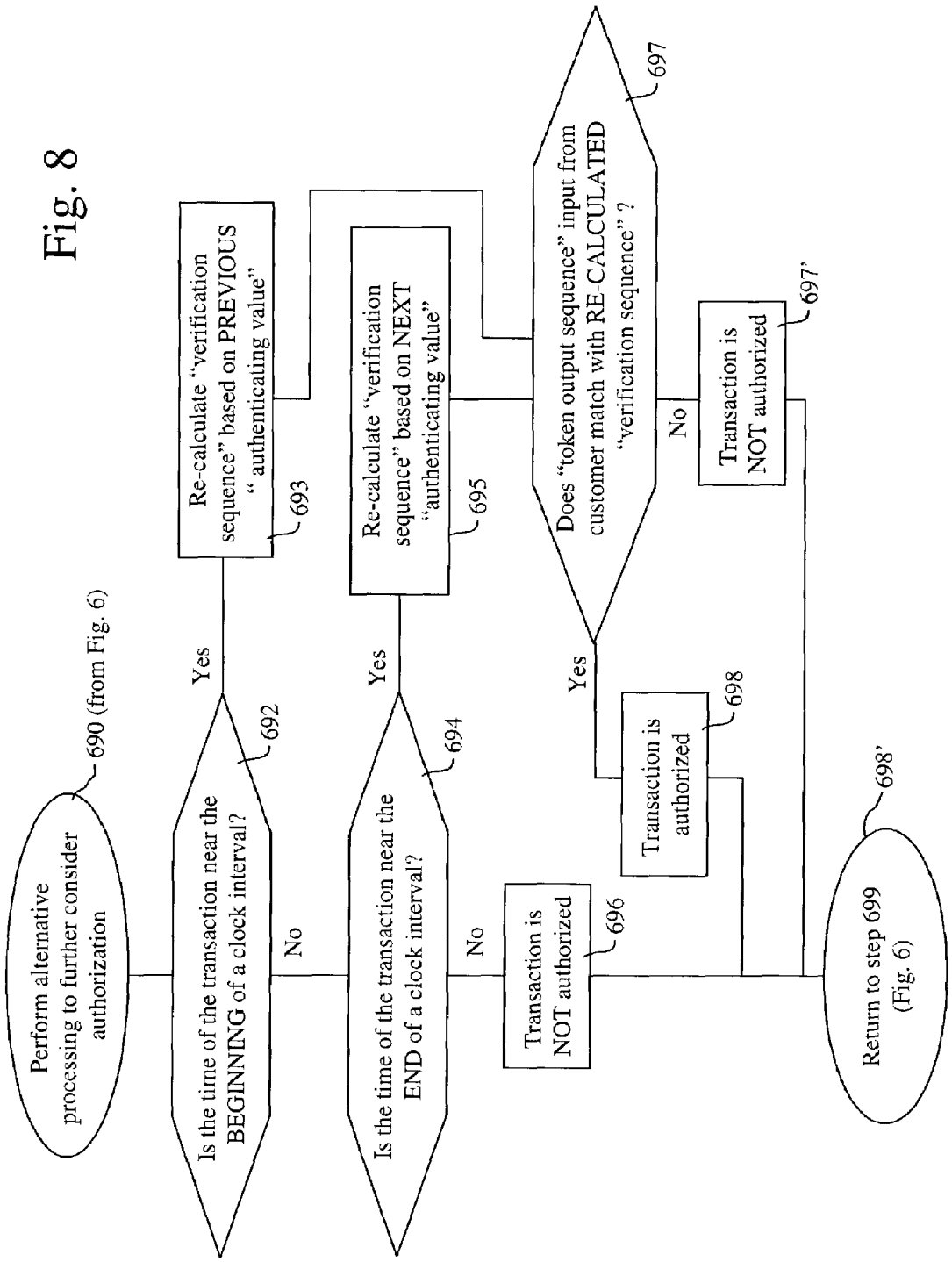
FIG. 8 is a flowchart showing the "perform alternative processing to further process authorization" step of FIG. 6 in accordance with one embodiment of the invention.

Alternatively, it may be the situation that in step 670, the token output sequence does not match with the verification sequence. As a result, the processes passes from step 670 to step 680. In step 680, an initial determination is made that the transaction is not authorized. However, this is merely an initial determination. That is, after step 680, the process passes to step 690. In step 690, the process performs alternative processing to further consider the authorization. That is, the process performs further processing to ascertain whether the transaction was indeed a valid transaction. FIG. 8 is a flowchart showing in further detail step 690. After 690 of FIG. 6, the process passes to step 699

In step 699, the process may perform a supplemental transaction validation, as is necessary or desired. That is, it is appreciated that there may be other criteria that makes an authenticator decide to allow the transaction or not. For example suppose a transaction is coming supposedly from Seattle and the authenticating authority experienced a transaction, with the same token, from New York 10 minutes ago. The authenticating authority might want to decline this transaction even if the authorization number appeared to be correct. Likewise even if the transaction is not authorized, maybe the issuer will determine the electronics have glitched and he may use other information, ask the merchant for other information, or just warn the merchant and let the merchant decide whether to go ahead anyway, i.e., since the merchant will bear any loss. After step 699, the process passes to step 700. In step 700, the process returns to step 800 of FIG. 5.

Figure 7:
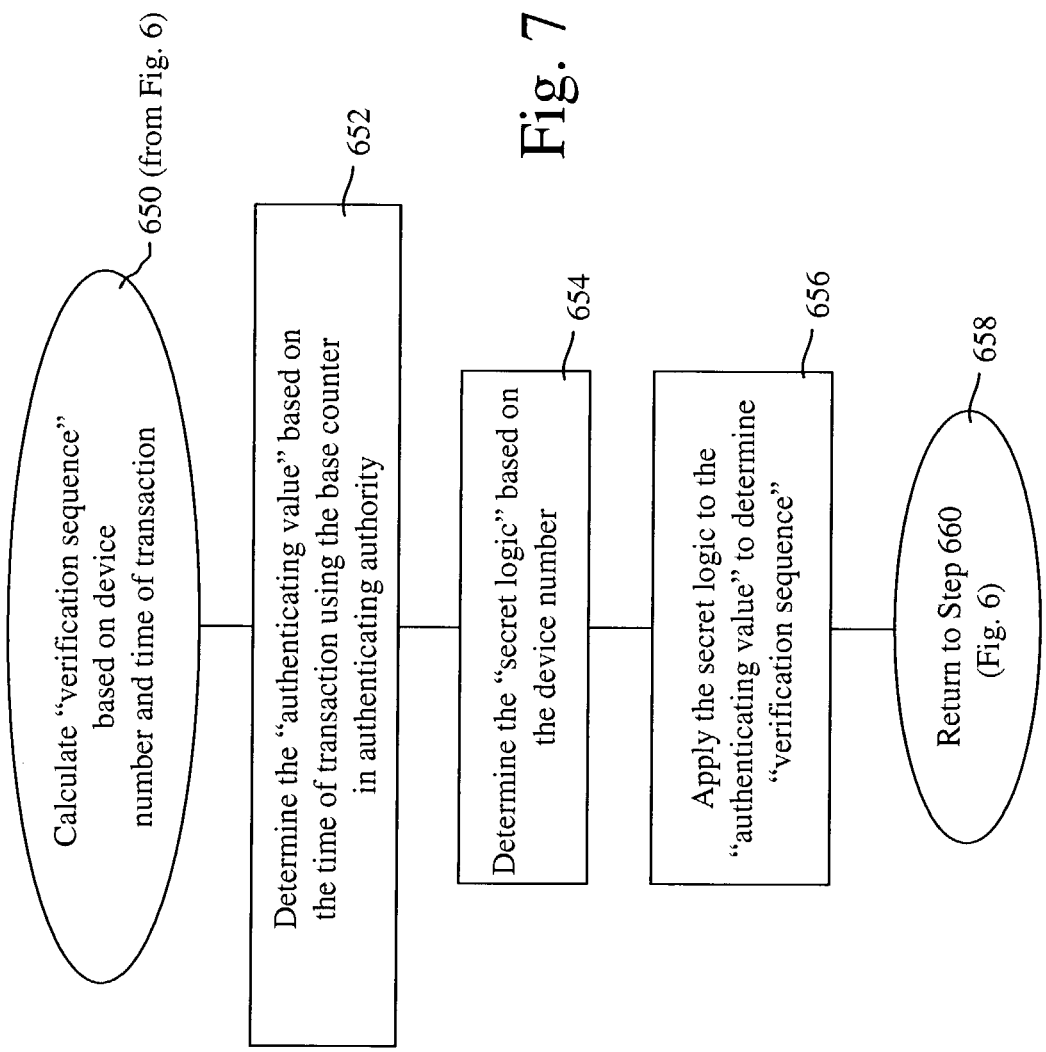
FIG. 7 is a flowchart showing the "calculate 'verification sequence' based on device number and time of transaction" process of FIG. 6 in accordance with one embodiment of the invention.

FIG. 7 is a flowchart showing in further detail step 650 of FIG. 6 "calculate verification sequence based on device number and time of transaction." After the sub-process of FIG. 7 starts, the process passes from step 650 to step 652. In step 652, the process determines the "authenticating value" based on the time of transaction. Then, in step 654, the process determines the "secret logic" based on the device number. That is, it is appreciated that different logics may be used for different devices. The device number, or some other identifying indicia that may be associated with a particular device, may be used to determine which logic should be applied by the authenticating authority. After step 654, the process passes to step 656. In step 656, the process proceeds with applying the secret logic to the "authenticating value" to determine, in turn, the "verification sequence". After step 656, the process passes to step 658. In step 658, the process returns to step 660 of FIG. 6.

FIG. 8 is a flowchart showing in further detail the "perform alternative processing to further process authorization" step 690 of FIG. 6. In particular, the process of FIG. 8 relates to the situation where clock drift has occurred between the clock in the authenticating authority as compared with the clock in the token 100. Such drift between the clocks may result in an initial finding that a transaction is not valid. However, the process of FIG. 8 addresses a potential incorrect finding of an invalid transaction.

To explain, the process of FIG. 8 starts in step 690 and passes to step 692. In step 692, the process determines whether the time of transaction is near the beginning of a clock interval, i.e., is the time of the transaction near the time that the clock in the authenticating authority experienced a change. If yes in step 692, then the process passes to step 693. In step 693, the process recalculates the verification sequence based on the previous base counter setting. After step 693, the process passes to step 697.

Alternatively, in step 692, the process may have determined that the time of the transaction is not at the beginning of a clock interval. As a result, the process passes to step 694. In step 694, the process, as illustratively performed by the authenticating authority, determines whether the time of the transaction is near the end of a clock interval. If yes, then the process passes from step 694 to step 695. In step 695, the process recalculates the "verification sequence" based on the next base counter setting. Then, the process passes to step 697.

In step 697, the process determines whether the token output sequence input by the customer matches with the recalculated verification sequence. That is, step 697 checks whether the previous or the next clock setting of step 693 and step 695, respectively, result in a match between the token output sequence and the verification sequence. If yes, then the process passes to step 698. That is, if there is indeed a match then the transaction is authorized. After step 698, the process passes to step 698'. Alternatively, in step 697, there may still not be a match between the token output sequence input by the customer and the recalculated verification sequence. As a result, the process passes to step 697' and the transaction is not authorized. After step 697', the process passes to step 698'.

As noted above, in step 694 of FIG. 8, the process determines whether the time of the transaction is near the end of a clock interval. Further, step 692 determined if the transaction is near the beginning of a clock interval. If neither of the situations is present, then the process passes to step 696. In step 696, the process determines that the transaction is indeed not authorized. As a result, the process passes to step 698'. However, it is appreciated that more then the immediately adjacent intervals may be considered. For example if the clock advances relatively quickly, this results in a potential for substantial clock drift. As a result, it may be desired to check three, for example, (or as many as desired) intervals before the initially considered interval, as well as three subsequent intervals, for example.

In step 698', the process returns to step 699 and then to step 700 of FIG. 6. As noted above, in step 700 of FIG. 6, the process returns to step 800 of FIG. 5 in which the verification process is terminated.

Figure 9:
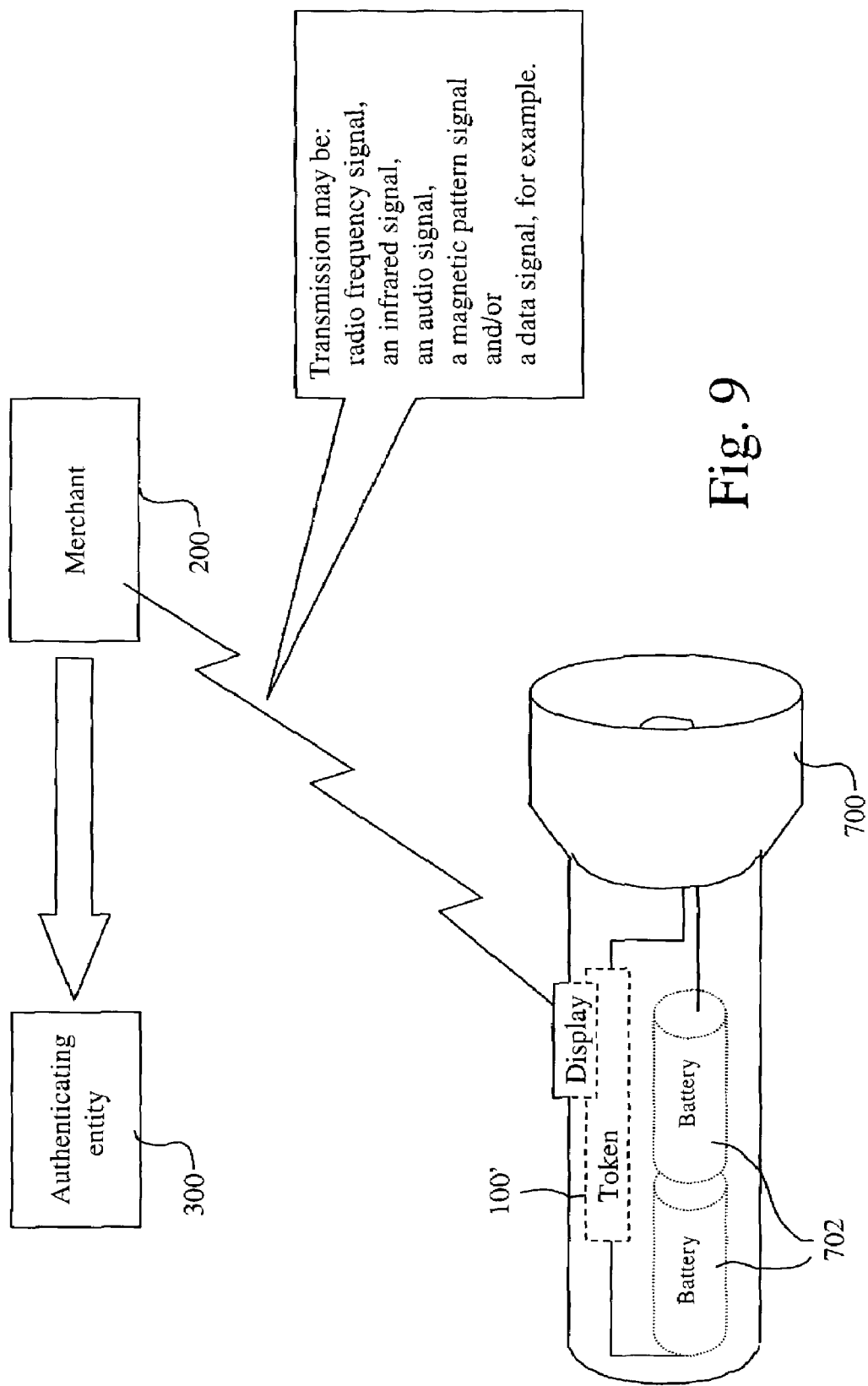
FIG. 9 is a diagram showing a token in a flashlight in accordance with one embodiment of the invention.

In accordance with a further embodiment of the invention, FIG. 9 is a diagram showing a token 100' disposed in a flashlight 700. The token 100' may operate in a similar manner to the token 100, as shown in FIG. 1. The flashlight 700 may include batteries 702. In accordance with one embodiment of the invention, the batteries 702 may power operations of the token 100'. As described above, the token 100' generates a token output sequence, and transmits the token output sequence to a merchant 200. This transmission may be in a variety of forms, as is shown in FIG. 9. In turn, the merchant 200 outputs the token output sequence, as well as a time stamp and a token device number, which is also obtained from the token, to the authenticating entity 300.

Figure 10:
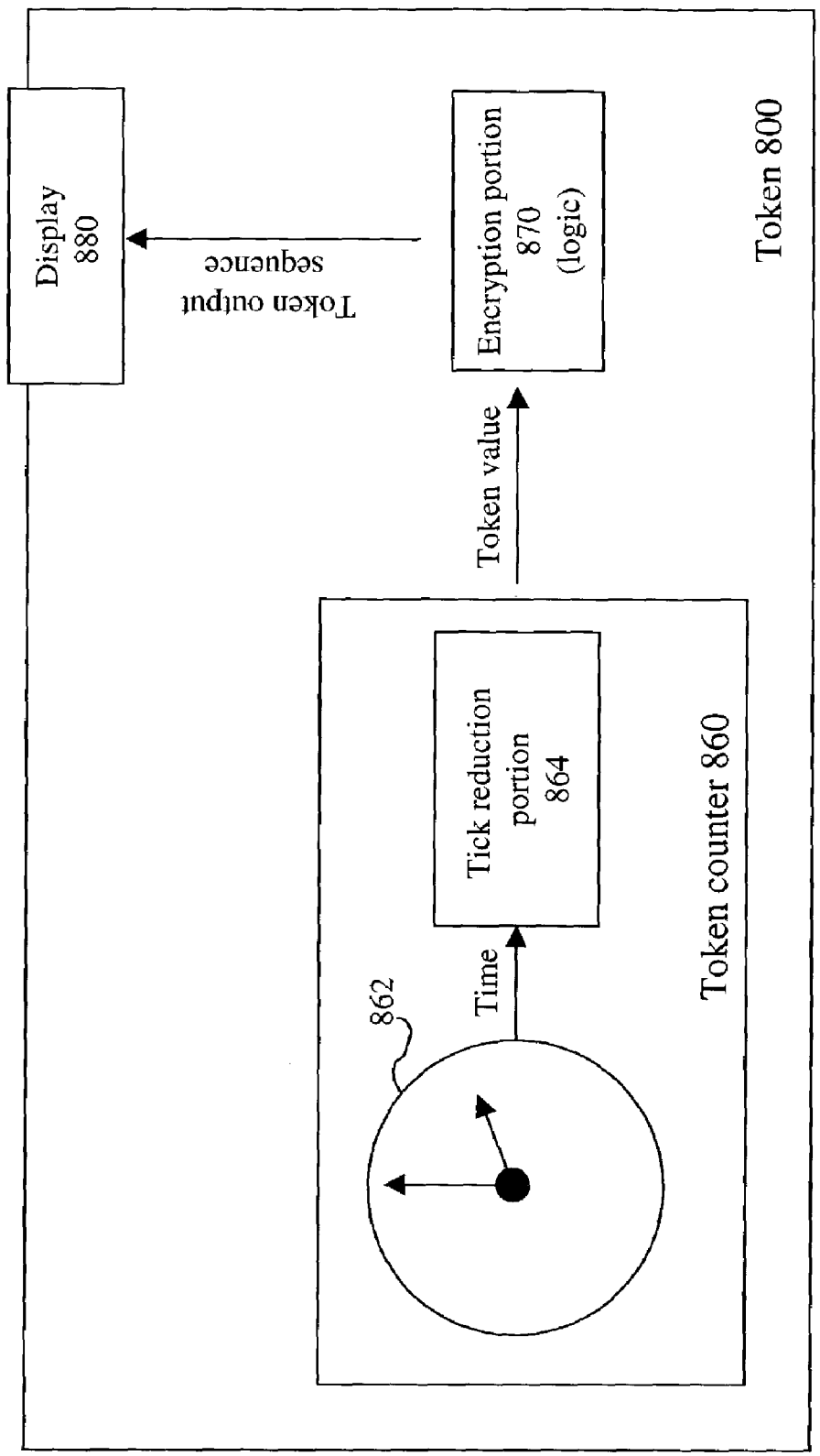
FIG. 10 is a block diagram showing a token using a twenty-four hour clock in accordance with one embodiment of the invention.

In accordance with a yet further embodiment of the invention, FIG. 10 is a block diagram showing a token 800 that may operate in a similar manner to the token 100. The token 800 includes an encryption portion 870 and a display 880. The encryption portion 870 provides the logic to convert the token value into the token output sequence, as described above. This logic may take on a variety of forms so as to manipulate the token value, as is desired, i.e., such as a mathematical manipulation of the token value, for example. The token counter of the embodiment of FIG. 10 includes a clock 862 and a tick reduction portion 864. The clock may be a standard twenty-four hour clock, but may preferably be a digital clock, i.e., such that a digital output may be output to the tick reduction portion 864.

The tick reduction portion 864 works off the advancement of the clock 862 to generate the token values. However, the tick reduction portion 864 advances at a much slower rate. For example, for every 12 hours that the clock 862 advances, the tick reduction portion 864 may only advance once. As is noted above, such reduced advancement reduces the effects of clock drift between the token and the authenticating authority.

In accordance with further aspects of the invention, it is appreciated that the token value, the token output sequence, the authenticating value, and the verification sequence, for example, may be numbers, letters, symbols, punctuation and/or any other character set, for example. However, the particular composition of the token value, as well as the corresponding authenticating value, should be such that such values may advance in a routine manner.

As described above, the systems and methods of the invention rely upon time stamping in accordance with embodiments of the invention. Accordingly, a variety of techniques may be used to address different time zones. For example, one time zone may be designated as a standard and all time stamps converted to this standard.

As described above, methods and systems are disclosed which permit tokens used for finance to be checked for authenticity by having the tokens display an authentication code that varies with time, yet can be validated by the token validation authority. Because the authentication code changes, such codes may not readily be stored and stolen, as is a problem in existing codes. The invention reduces fraud for all involved where there is risk that a token might be a forgery.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for authenticating a finance related transaction for a customer, the customer being a person, comprising:

providing a token which contains a token counter, the token counter periodically advancing to generate a changing token value, the token counter being synchronized to a base counter that generates an authenticating value;

transforming, by the token, the token value into a token output sequence using logic;

outputting, by the token, at least part of the token output sequence to the customer, such outputting to the customer consisting of the at least part of the token output sequence;

inputting from the customer, by an authenticating authority, the at least part of the token output sequence, such inputting from the customer consisting of the at least part of the token output sequence, the authenticating authority having access to the authenticating value, the authenticating authority constituted by a processing system, the at least part of the token output sequence being input by the authenticating authority via a merchant; and verifying, by the authenticating authority, the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence; and the method further including:

generating a time stamp value at a time of the transaction: and the authenticating authority inputting the time stamp value, and the base counter, which is in the authenticating authority determining the value of the authenticating value based on the time stamp value.

2. The method of claim 1, wherein the logic includes a process that is known to the authenticating authority such that the token output sequence cannot be predicted without possession of the logic.

3. The method of claim 1, wherein a display on the token displays at least a part of the token output sequence.

4. The method of claim 1, wherein the token output sequence is output to the authenticating authority, along with other information from the token, and the other information is used by the authenticating authority to verify the validity of the transaction.

5. The method of claim 1, wherein the token output sequence is output to the authenticating authority along with other information, which is memorized by a holder of the token, and the other information is used by the authenticating authority to verify the validity of the transaction.

6. The method of claim 5, wherein the authenticating authority duplicates the logic that transforms the token value into the token output sequence in such as manner so as to transform the authenticating value into the verification sequence.

7. The method of claim 1, wherein the authenticating authority compares only a part of the token output sequence with a corresponding part of the verification sequence.

8. The method of claim 1, wherein the authenticating authority uses equality of at least a part of the token output sequence as compared with a corresponding part of the verification sequence to verify the validity of the transaction.

9. The method of claim 1 wherein the token is at least one of a credit card and debit card and the token output sequence is displayed on a display, the display being a human readable display.

10. The method of claim 1, wherein the token is used for authentication for payment processing, the transaction relating to a monetary exchange.

11. The method of claim 1, wherein the token is not internally secure and wherein a second identifier built into the token is used by the authenticating authority for verifying the validity of the transaction.

12. The method of claim 11, wherein the second identifier is input by the authenticating authority along with the token output sequence.

13. The method of claim 1, wherein the token output sequence is at least one of numbers, letters and symbols.

14. The method of claim 1, wherein the outputting at least part of the token output sequence to an authenticating authority includes using at least one of a radio frequency signal, an infrared signal, an audio signal, a magnetic pattern signal and a data signal.

15. The method of claim 1, wherein the token counter periodically advancing to generate a changing token value includes the token counter advancing through a sequential progression of numbers.

16. The method of claim 15, wherein the token counter includes a clock.

17. The method of claim 16, wherein the clock is a 24 hour time clock, and wherein the token value changes based on progression of the clock, but at a slower rate than the clock.

18. The method of claim 1, further including:
the token possessing a device identification;
the authenticating authority inputting the device identification, and the authenticating authority determining the logic to apply based on the device identification.

19. The method of claim 1, wherein the authenticating value is a first authenticating value, the method further including:
the authenticating authority comparing the token output sequence to the verification sequence and determining that there is not a match between the token output sequence and the verification sequence;
the authenticating authority recalculating a second authenticating value based on a previous base counter setting, the authenticating authority using the logic to generate a second verification sequence based on the second authenticating value; and
the authenticating authority comparing the token output sequence to the second verification sequence to determine a match between the token output sequence and the second verification sequence.

20. The method of claim 1, wherein the authenticating value is a first authenticating value, the method further including:
the authenticating authority comparing the token output sequence to the verification sequence and determining that there is not a match between the token output sequence and the verification sequence;
the authenticating authority recalculating a second authenticating value based on a subsequent base counter setting, the authenticating authority using the logic to generate a second verification sequence based on the second authenticating value; and
the authenticating authority comparing the token output sequence to the second verification sequence to determine a match between the token output sequence and the second verification sequence.

21. The method of claim 1, wherein the outputting being performed through the person of the customer includes the authenticating authority receiving the at least part of the token output sequence by the customer verbally conveying the at least part of the token output sequence to a merchant.

22. The method of claim 1, wherein the inputting from the customer consisting of part of the token output sequence.

23. The method of claim 1, the input by the authenticating authority via a merchant is performed using at least one selected from the group consisting of: an LED (light emitting diode), an LCD (liquid crystal display), a magnetic strip, an audio signal, a magnetic pattern.

24. The method of claim 1, the input by the authenticating authority via a merchant is performed using at least one selected from the group consisting of: a radio frequency signal and an infrared signal.

25. A system for authenticating a finance related transaction, the system comprising:
- an authenticating authority; and
- a token that includes a token counter, the token counter periodically advancing to generate a changing token value in conjunction with the transaction, the token transforming the token value into a token output sequence using logic in a logic portion, the token outputting at least part of the token output sequence to the authenticating authority using a display, the token outputting a time of the transaction to the authenticating authority;
- the authenticating authority determining a base counter based on the time of the transaction, the authenticating authority verifying the validity of the transaction based on the token output sequence and the base counter, the authenticating authority obtaining a verification sequence based on the base counter using the logic; and
- the authenticating authority verifying the validity of the transaction includes comparing the token output sequence to the verification sequence to determine if there is a match between the token output sequence and the verification sequence.

26. The system of claim 25, wherein the token possesses a device identification; and
- the authenticating authority inputting the device identification, and the authenticating authority determining the logic to apply based on the device identification.

27. The system of claim 25, wherein the display of the token is one of a magnetic strip, a radio frequency generating device, an infrared signal generating device, an audio signal generating device, and a magnetic pattern generating device.

28. The system of claim 25, wherein the token is included in a flashlight, the flashlight including a lighting portion and a battery.

29. The system of claim 25, wherein the token is included in a device selected from the group consisting of a key chain, cellular phone, a personal digital assistant, and a watch.

30. The system of claim 25, wherein the token possesses a device identification; and
- the authenticating authority inputting the device identification, and the authenticating authority using the device identification in the logic to obtain the verification sequence.

31. The system of claim 25, the authenticating authority verifying the validity of the transaction includes checking the time of the transaction vis-à-vis an expected value.

32. The system of claim 25, the authenticating authority verifying the validity of the transaction includes generating respective verification sequences for at least one of (1) times before the time of transaction and (2) times after the time of transaction.

33. A method for authenticating a finance related transaction for a customer, the customer being a person, comprising:
- providing a token which includes a token counter, the token counter periodically advancing to generate a changing token value, the token counter being synchronized to a base counter in an authenticating authority;
- the token transforming the token value into a token output sequence using logic;
- the token outputting at least part of the token output sequence to the person of the customer, and
- token outputting a time of the transaction to the authenticating authority; and
- inputting, by the authenticating authority, the time of the transaction, the authenticating authority inputting at least part of the token output sequence from the person of the customer, the inputting being performed via a communication through a merchant processing portion; and
- the authenticating authority determining the base counter based on the time of the transaction, the authenticating authority generating the authenticating value based on the base counter;
- verifying, by the authenticating authority, the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence.

* * * * *